United States Patent
Keyser

(10) Patent No.: US 9,426,219 B1
(45) Date of Patent: Aug. 23, 2016

(54) EFFICIENT MULTI-PART UPLOAD FOR A DATA WAREHOUSE

(71) Applicant: Amazon Technologies, Inc., Reno, NV (US)

(72) Inventor: Chris Alan Keyser, Hatboro, PA (US)

(73) Assignee: Amazon Technologies, Inc., Reno, NV (US)

( * ) Notice: Subject to any disclaimer, the term of this patent is extended or adjusted under 35 U.S.C. 154(b) by 195 days.

(21) Appl. No.: 14/098,912

(22) Filed: Dec. 6, 2013

(51) Int. Cl.
| | |
|---|---|
| G06F 15/167 | (2006.01) |
| H04L 29/08 | (2006.01) |
| H04L 29/06 | (2006.01) |
| G06F 17/30 | (2006.01) |

(52) U.S. Cl.
CPC ............ *H04L 67/1097* (2013.01); *H04L 67/42* (2013.01); *G06F 17/30563* (2013.01); *G06F 17/30584* (2013.01); *G06F 17/30592* (2013.01)

(58) Field of Classification Search
CPC .................... G06F 17/30563; G06F 17/30584; G06F 17/30592
USPC ......................................... 709/203, 213, 215
See application file for complete search history.

(56) References Cited

U.S. PATENT DOCUMENTS

| | | | |
|---|---|---|---|
| 6,208,990 B1 | 3/2001 | Suresh et al. | |
| 6,587,857 B1 | 7/2003 | Carothers et al. | |
| 8,429,117 B2 | 4/2013 | Devadoss et al. | |
| 8,571,909 B2 | 10/2013 | Miller et al. | |
| 2004/0267751 A1 | 12/2004 | Dill et al. | |
| 2009/0281985 A1* | 11/2009 | Aggarwal | G06F 17/30489 |
| 2012/0265726 A1 | 10/2012 | Padmanabhan et al. | |
| 2013/0066771 A1 | 3/2013 | Ciurea et al. | |
| 2013/0097170 A1* | 4/2013 | Flanagan | G06F 3/0611 |
| | | | 707/737 |
| 2013/0151464 A1 | 6/2013 | Hermann et al. | |
| 2013/0151491 A1* | 6/2013 | Gislason | G06F 17/30339 |
| | | | 707/696 |
| 2013/0205028 A1 | 8/2013 | Crockett et al. | |
| 2013/0275363 A1 | 10/2013 | Wu et al. | |

* cited by examiner

*Primary Examiner* — Wing F Chan
*Assistant Examiner* — Joseph Maniwang
(74) *Attorney, Agent, or Firm* — Robert C. Kowert; Meyertons, Hood, Kivlin, Kowert & Goetzel, P.C.

(57) ABSTRACT

Data may be partitioned and uploaded in multiple parts in parallel to a data warehouse cluster in a data warehouse system. Data to be uploaded may be identified, and the partitions for the data may be determined at the storage client. The data may then be partitioned at the storage client. In various embodiments, no local partitions of the data may be maintained in persistent storage at the storage client. The partitioned data may then be sent in parallel to a data warehouse staging area in another network-based service that is implemented as part of a same network-based service implementing the data warehouse system. A request may then be sent to the data warehouse cluster to perform a multi-part upload from the staging area to the data warehouse cluster.

20 Claims, 11 Drawing Sheets

EFFICIENT MULTI-PART UPLOAD FOR A DATA WAREHOUSE

BACKGROUND

As the technological capacity for organizations to create, track, and retain information continues to grow, a variety of different technologies for managing and storing the rising tide of information have been developed. Database systems, for example, provide clients with many different specialized or customized configurations of hardware and software to manage stored information. However, the increasing amounts of data organizations must store and manage often correspondingly increases both the size and complexity of data storage and management technologies, like database systems, which in turn escalate the cost of maintaining the information. New technologies more and more seek to reduce both the complexity and storage requirements of maintaining data while simultaneously improving the efficiency of data storage and data management.

One effect of larger amounts of data arises when data needs to be moved from one form of storage to another, such as uploading data to a data warehouse. Transporting large data files over network or other type of communication infrastructure can result burdensome costs. Large files may be moved over a single network link, leading to longer transport times and costs in network resources that may not be used for other operations. However, multi-part or parallel uploads of large data files may prove equally challenging without expertise or special-knowledge of the systems which are sending and receiving the large amount of data. Thus, a need remains for more efficient way to move large data files from one storage system to another.

Figure 1:
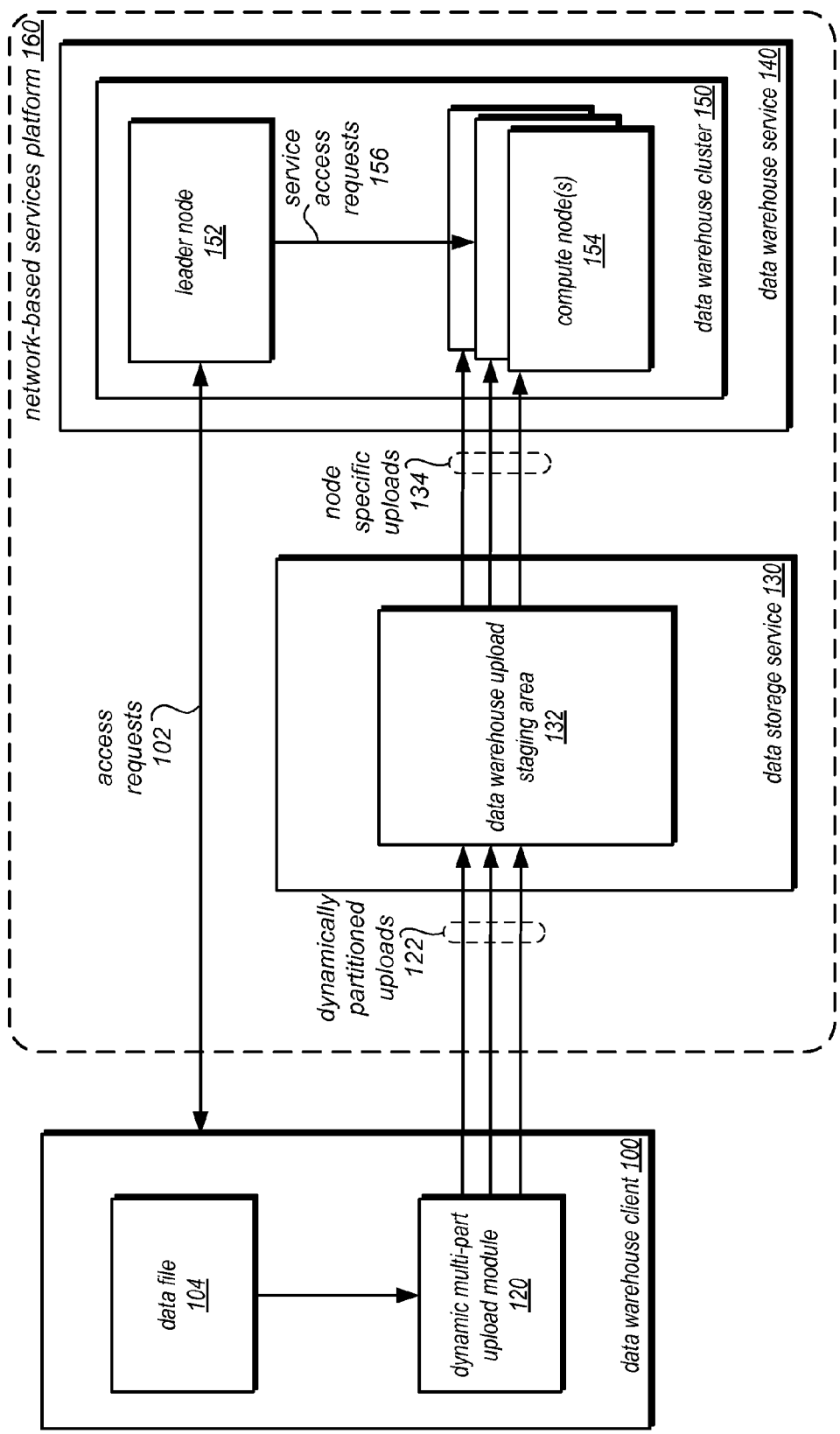
FIG. 1 illustrates a block diagram of dynamic multi-part upload for a data warehouse, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of dynamic, multi-part upload for a data warehouse are described herein. Generally, data warehouse systems provide storage and analysis capabilities for storage clients. Large amounts of data are typically uploaded to, maintained at, and managed by data warehouse systems, in order to provide various types of analysis for users of a data warehouse system. In order to manage the larger sets of data, as well as perform efficient analysis, data warehouse systems may be implemented in a distributed manner, in various embodiments. A data warehouse cluster, for example, may be a collection of compute nodes that work together to store and analyze data at the data warehouse. By distributing data and work among the different compute nodes, a data warehouse cluster may perform storage management and analysis operations in parallel or near-parallel. A storage format for the data warehouse cluster, such as a column-oriented data table scheme (sometimes referred to as columnar), may be implemented at the compute nodes of the data warehouse cluster in some embodiments.

In various embodiments, a data warehouse cluster may implement a single point of access for storage clients of the data warehouse, such that various different operations, such as uploading data, modifying data, analysis requests, and/or retrieving data, may be received at a same access point. In at least some embodiments, a leader node may be designated as the single access point for a storage client of a data warehouse cluster. However, if a storage client is to upload a large file, the single access point to the data warehouse cluster, may prove inefficient. For example, bandwidth to the single access point may be limited, as well as the capacity to receive and process data at the single access point, leading to greater transportation costs as well as time spent uploading data to the data warehouse cluster. Meanwhile, other compute nodes in the data warehouse cluster, which may store the data for a storage client, may not be directly accessible to the storage client. Thus, typical uploads for large data files to a data warehouse cluster may prove frequent as it is the nature a data warehouse system to store large amounts of data and costly.

In various embodiments, a data warehouse cluster may be implemented as part of a data warehouse service. The data warehouse service, in turn, may be implemented as part of a network-based services platform. A network-based services platform, as described in further detail below with regard to FIG. 2, may provide multiple services, such as analysis, data storage, streaming, simulation, and/or various other processing of data for clients of the network-based services. A benefit of implementing the data warehouse service as part of the network-based service platform, is that clients of the data warehouse service may leverage the capabilities of other network-based services in order to improve the performance and/or service provided by the data warehouse service, such as by providing various techniques for uploading data from a storage client to a data warehouse cluster in a data warehouse service in multiple parts, in parallel, which may be significantly more efficient than a single part upload to a single access point.

FIG. 1 illustrates a block diagram of dynamic multi-part upload for a data warehouse, according to some embodiments. Data warehouse client 100 may be any node, system, or device, such as described below with regard to clients 250 and 350 in FIGS. 2 and 3, configured to access data stored for data warehouse client at data warehouse service 140. Specifically, data warehouse client may be configured to access data warehouse cluster 150. In various embodiments, data warehouse cluster 150 may be implemented by multiple compute nodes. In some embodiments, one compute node may be a leader node 152, and be configured to receive access requests 102 from data warehouse client for data stored at data warehouse cluster 150. For example, access requests may include various queries, analysis requests, data modifications, insertions, deletions, and/or uploads.

In various embodiments, leader node 152 may generate execution plans, instructions, or provide direction to compute nodes 154 which may be responsible for different portions of data stored for data warehouse client 100, as may be determined according to a data distribution scheme. The data distribution scheme may include configuration information for the data warehouse cluster. For example, each compute node 154 may implement one or more data slices, each of which may maintain a separate portion of data for data warehouse client 100. Each slice may perform operations independently, and in parallel, with other data slices on the same compute node as well as other compute nodes 154. The data distribution scheme may indicate the number of compute nodes, as well as their respective slices. Data may be distributed among the compute nodes 154 and/or slices of compute nodes 154, in various embodiments, according to a distribution technique indicated by the data distribution scheme. For example a data distribution scheme, may that indicate that round robin distribution of data may be performed among compute nodes 154. Alternatively, the data distribution scheme may indicate that a particular value in data, such as a particular column value, may act as a distribution key, according to which the data may be distributed among the compute nodes 154. In various embodiments, compute nodes 154 may not be directly accessible to data warehouse client 100.

Figure 5:
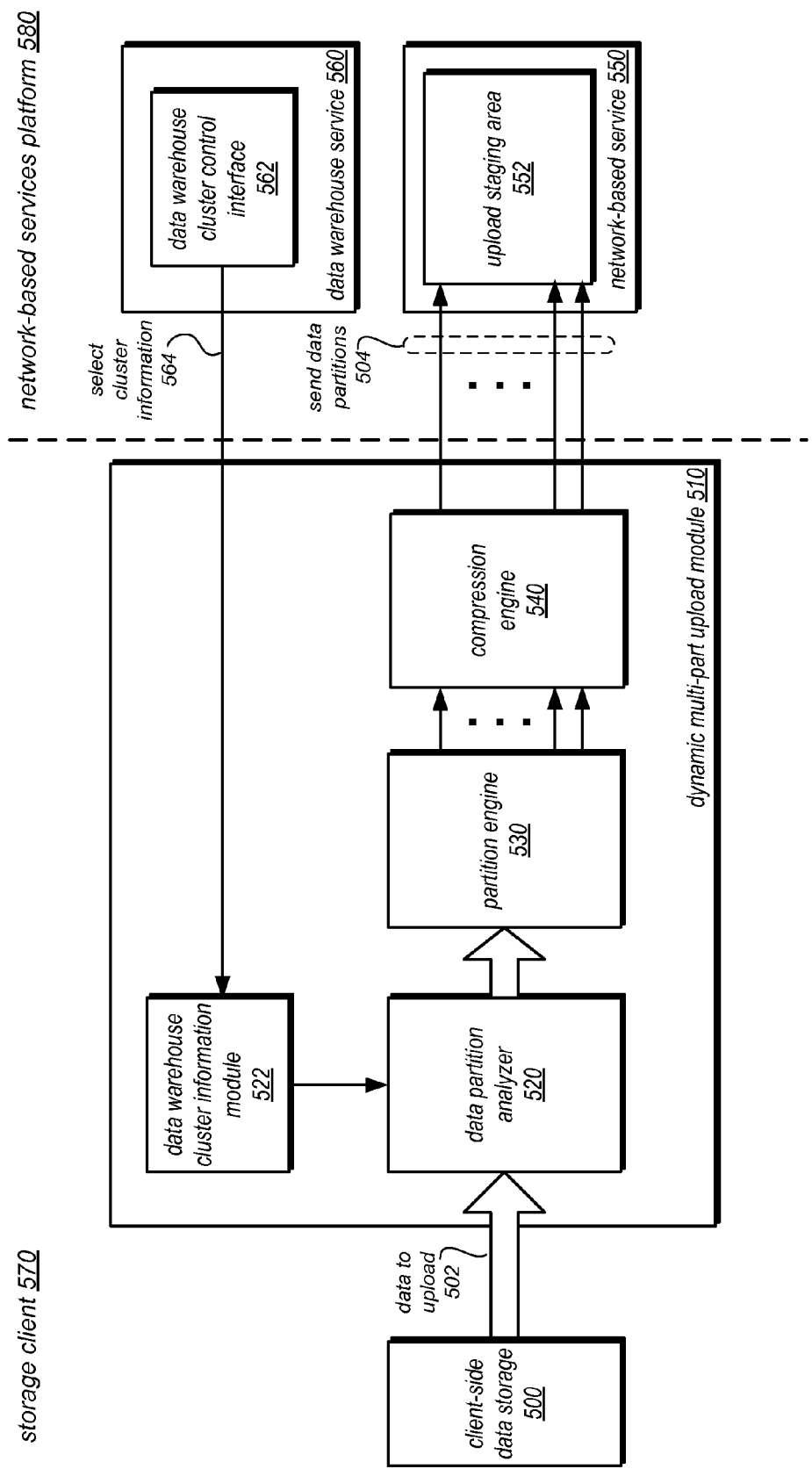
FIG. 5 is a block diagram illustrating a dynamic multi-part upload module, according to some embodiments.

In order to upload data to compute nodes 154 in data warehouse cluster 150 in parallel, data warehouse client 100 may implement dynamic, multi-part upload module 120. Dynamic, multi-part upload module 120 may be a standalone application implemented a data warehouse client 100, or an application, executable, or other component sent to a data warehouse client from network-based services platform 160 in order to implement dynamic, multi-part upload (e.g., such as in response to an upload request to data warehouse cluster 150 received at a cluster control interface). FIGS. 5 and 6, described in further detail below, discuss the various different ways a dynamic multi-part upload module 120 may be configured.

In some embodiments, data to be uploaded to data warehouse cluster 150 may be identified, such as data file 104. The identified data may be obtained by dynamic, multi-part upload module 120, and partitions may be determined for the data file 104. For example, in some embodiments, the data file may be evaluated to determine partition locations which may preserve data objects within each partition of the data file. Dynamic multi-part upload module 120 may then dynamically partition data file 104 in to the determined partitions. For example, in some embodiments, data file 104 may be read into and partitioned in system memory such that no local partition in persistent storage may be generated or maintained at data warehouse client 100. The dynamic partitions may then be uploaded 122 in parallel to another network-based service implemented as part of network-based services platform 160, such as data storage service 130.

Data storage service 130 may provide data storage for clients of network-based services platform 160. A feature of data storage service 130 may allow for multi-part uploads to be performed so that data may be transferred from a client in parallel to data storage service 130. In various embodiments, dynamically partitioned uploads 122 from dynamic, multi-part upload module 120 may be stored in portion of data storage service 130 that acts as a data warehouse upload staging area 132. Data warehouse upload staging area 132 may be directly accessible to compute nodes 154 in data warehouse cluster 150, in some embodiments. Thus, at dynamically partitioned data may be uploaded in parallel from the data warehouse upload staging area 132 to specific nodes/slices 134 (as may be determined according to the data distribution scheme for data warehouse cluster 150). In some embodiments, dynamically partitioned data in staging area 132 may be regrouped, reorganized, and/or restructured in prior to node specific uploads 134 being performed.

Please note, that the description provided above with regard to FIG. 1 is not intended to be limiting as to the specific implementations of various components, their interactions, number or type of partitions, or any other aspect of dynamic multi-part uploads for a data warehouse. For example, other network-based storage services may receive the dynamically partitioned uploads 122 and perform subsequent processing before sending the data on to data warehouse staging area 132 in another network-based service of network-based services platform 160.

The specification first provides an example of a data warehouse service, including an example of a data warehouse cluster, as well as other network-based services offered by a same network-based services platform, according to some embodiments. Various implementations of dynamic, multi-part upload for the data warehouse are described with regard to the data warehouse cluster. The specification then describes various techniques and methods for implementing dynamic, multi-part upload for a data warehouse. Finally, an example computer system is described which may implement various different components of the systems, methods and techniques described herein.

Figure 2:
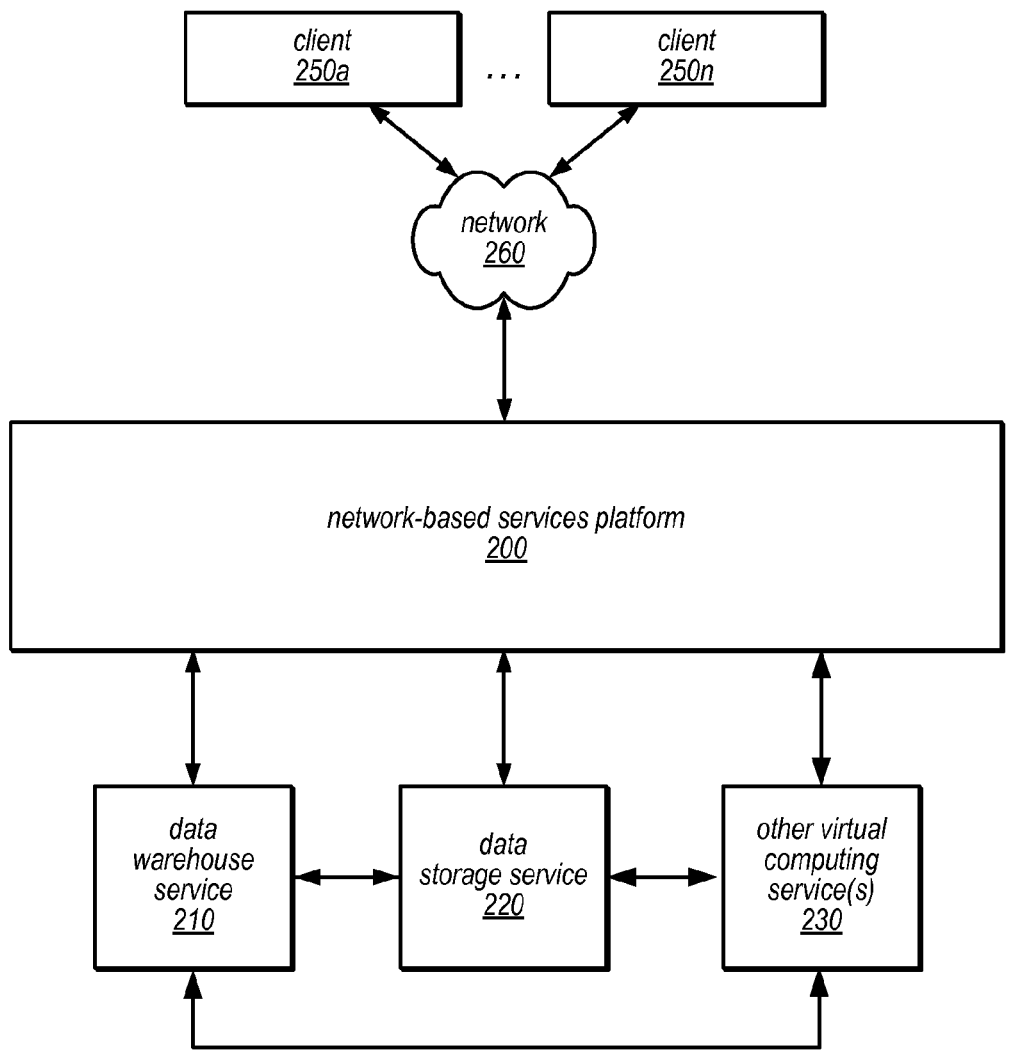
FIG. 2 is a block diagram illustrating an example operating environment for a data warehouse service, according to some embodiments.

One embodiment of a service system architecture that may be configured to implement a data warehouse cluster as part of a data warehouse service is illustrated in FIG. 2. A number of clients (shown as clients 250a-250n) may be configured to interact with a network-based services platform 200 via a network 260. Network-based services platform 200 may be configured to interface with one or more instances of a data warehouse service 210, a data storage service 220, and/or one or more other virtual computing services 230. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 9 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Generally speaking, clients 250 may encompass any type of client configurable to submit network-based services requests to network-based services platform 200 via network 260, including requests for database services (e.g., a request to generate a snapshot, etc.). For example, a given client 250 may include a suitable version of a web browser, or may include a plug-in module or other type of code module configured to execute as an extension to or within an execution environment provided by a web browser. Alternatively, a client 250 (e.g., a data warehouse client) may encompass an application such as a database application (or user interface thereof), a media application, an office application or any other application that may make use of persistent storage resources to store and/or access one or more databases. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application configured to interact directly with network-based services platform 200. In some embodiments, client 250 may be configured to generate network-based services requests according to a Representational State Transfer (REST)-style network-based services architecture, a document- or message-based network-based services architecture, or another suitable network-based services architecture.

In some embodiments, a client 250 (e.g., a data warehouse client) may be configured to provide access to network-based services-based storage of databases to other applications in a manner that is transparent to those applications. For example, client 250 may be configured to integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of the storage system service model of FIG. 1. Instead, the details of interfacing to network-based services platform 200 may be coordinated by client 250 and the operating system or file system on behalf of applications executing within the operating system environment.

Clients 250 may convey network-based services requests (e.g., data access request) to and receive responses from network-based services platform 200 via network 260. In various embodiments, network 260 may encompass any suitable combination of networking hardware and protocols necessary to establish network-based-based communications between clients 250 and platform 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and network-based services platform 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and network-based services platform 200. It is noted that in some embodiments, clients 250 may communicate with network-based services platform 200 using a private network rather than the public Internet. For example, clients 250 may be provisioned within the same enterprise as a data service system (e.g., a system that implements data warehouse service 210 and/or data storage service 220). In such a case, clients 250 may communicate with platform 200 entirely through a private network 260 (e.g., a LAN or WAN that may use Internet-based communication protocols but which is not publicly accessible).

Generally speaking, network-based services platform 200 may be configured to implement one or more service endpoints configured to receive and process network-based services requests, such as requests to access data (or records thereof). For example, network-based services platform 200 may include hardware and/or software configured to implement a particular endpoint, such that an HTTP-based network-based services request directed to that endpoint is properly received and processed. In one embodiment, network-based services platform 200 may be implemented as a server system configured to receive network-based services requests from clients 250 and to forward them to components of a system that implements data warehouse service 210, data storage service 220 and/or another virtual computing service 230 for processing. For example, other virtual computing services 230 may implement various different simulation, computational, streaming or analysis operations that may be performed on data that is subsequently stored in data storage service 220 and/or data warehouse service 210. In other embodiments, network-based services platform 200 may be configured as a number of distinct systems (e.g., in a cluster topology) implementing load balancing and other request management features configured to dynamically manage large-scale network-based services request processing loads. In various embodiments, network-based services platform 200 may be configured to support REST-style or document-based (e.g., SOAP-based) types of network-based services requests.

In addition to functioning as an addressable endpoint for clients' network-based services requests, in some embodiments, network-based services platform 200 may implement various client management features. For example, platform 200 may coordinate the metering and accounting of client usage of network-based services, including storage resources, such as by tracking the identities of requesting clients 250, the number and/or frequency of client requests, the size of data (such as database tables or records thereof) stored or retrieved on behalf of clients 250, overall storage bandwidth used by clients 250, class of storage requested by clients 250, or any other measurable client usage parameter. Platform 200 may also implement financial accounting and billing systems, or may maintain a database of usage data that may be queried and processed by external systems for reporting and billing of client usage activity. In certain embodiments, platform 200 may be configured to collect, monitor and/or aggregate a variety of warehouse/storage service system operational metrics, such as metrics reflecting the rates and types of requests received from clients 250, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of data warehouse service 210, data storage service 220 and/or another virtual computing service 230 (or the underlying systems that implement those services).

In some embodiments, network-based services platform 200 may also implement user authentication and access control procedures. For example, for a given network-based services request to access a particular portion of data, such as a particular database, platform 200 may be configured to ascertain whether the client 250 associated with the request is authorized to access the particular data. Platform 200 may determine such authorization by, for example, evaluating an identity, password or other credential against credentials associated with the particular database, or evaluating the requested access to the particular database against an access control list for the particular data. For example, if a client 250 does not have sufficient credentials to access the particular data, platform 200 may reject the corresponding network-based services request, for example by returning a response to the requesting client 250 indicating an error condition. Various access control policies may be stored as records or lists of access control information by data warehouse service 210, data storage service 220 and/or other virtual computing services 230.

It is noted that while network-based services platform 200 may represent the primary interface through which clients 250 may access the features of a database system that implements data warehouse service 210, it need not represent the sole interface to such features. For example, an alternate API that may be distinct from a network-based services interface may be used to allow clients internal to the enterprise providing the data warehouse system to bypass network-based services platform 200. Note that in many of the examples described herein, data storage service 220 may be internal to a computing system or an enterprise system that provides database services to clients 250, and may not be exposed to external clients (e.g., users or client applications). In such embodiments, the internal "client" (e.g., data warehouse service 210) may access data storage service 220 over a local or private network, shown as the solid line between data storage service 220 and data warehouse service 210 (e.g., through an API directly between the systems that implement these services). In such embodiments, the use of data storage service 220 in storing databases on behalf of clients 250 may be transparent to those clients. In other embodiments, data storage service 220 may be exposed to clients 250 through network-based services platform 200 to provide storage of data, staging for data upload into data warehouse service 210, or other information for applications other than those that rely on data warehouse service 210 for data management. In some embodiments, clients of the data storage service 220 may access data storage service 220 via network 260 (e.g., over the Internet). In some embodiments, a virtual computing service 230 may be configured to receive storage services from data storage service 220 (e.g., through an API directly between the virtual computing service 230 and distributed storage service 220) to store objects used in performing computing services 230 on behalf of a client 250. Similarly, other virtual computing services 230 may be configured to send data to data warehouse service 210 for storage after collecting, processing, and or performing various other operations. In some cases, the accounting and/or credentialing services of platform 200 may be unnecessary for internal clients such as administrative clients or between service components within the same enterprise.

Although not illustrated, in various embodiments data storage service 220 may be configured to interface with backup data store, system, service, or device. Various data, such as data pages, records, and/or any other data maintained by data storage service internal clients, such as data warehouse service 210 or other virtual computing services 230, and/or external clients such as clients 250a through 250n, may be sent to a backup data store.

Note that in various embodiments, different storage policies may be implemented by data warehouse service 210 and/or data storage service 220. Examples of such storage policies may include a durability policy (e.g., a policy indicating the number of instances of a database (or data page thereof) that will be stored and the number of different nodes on which they will be stored), and/or a load balancing policy/data distribution scheme (which may distribute databases, or data pages thereof, across different nodes, volumes and/or disks in an attempt to equalize request traffic). In addition, different storage policies may be applied to different types of stored items by various one of the services.

Figure 3:
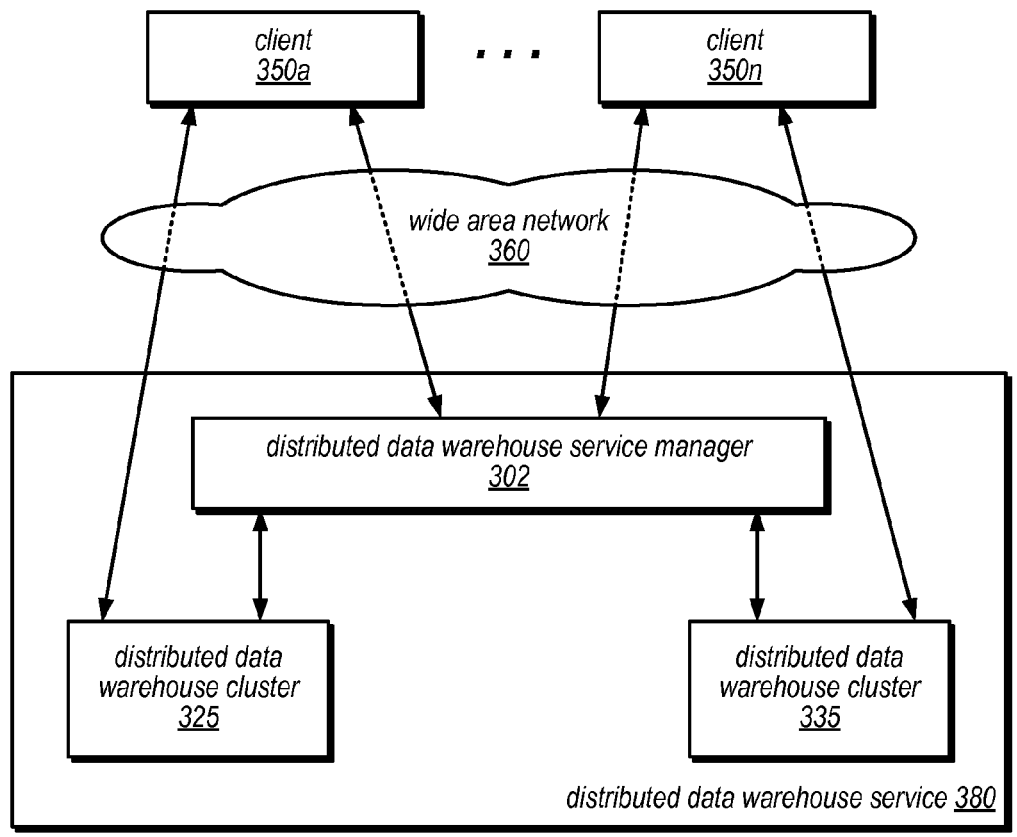
FIG. 3 is a block diagram illustrating an example distributed data warehouse service, according to some embodiments.

FIG. 3 illustrates an example distributed data warehouse service that may provide data management services to clients, according to some embodiments. This distributed data warehouse service may, in some embodiments, be offered as part of a variety of network-based services provided by a common network-based services platform, such as data warehouse service 210 discussed above with regard to FIG. 2. Specifically, distributed data warehouse clusters may respond to store requests (e.g., to write data into storage) or queries for data (e.g., such as a Structured Query Language request (SQL) for select data), along with many other data management or storage services.

Multiple users or clients may access a data warehouse cluster to obtain data warehouse services. Clients which may include users, client applications, and/or data warehouse service subscribers), according to some embodiments. In this example, each of the clients 350a through 350n is able to access distributed data warehouse cluster 325 and 335 respectively in the distributed data warehouse service 380. Distributed data warehouse cluster 325 and 335 may include two or more compute nodes on which data may be stored on behalf of the clients 350a through 350n who have access to those clusters. Data may be distributed among the compute nodes of a distributed data warehouse cluster according to a data distribute scheme.

Figure 9:
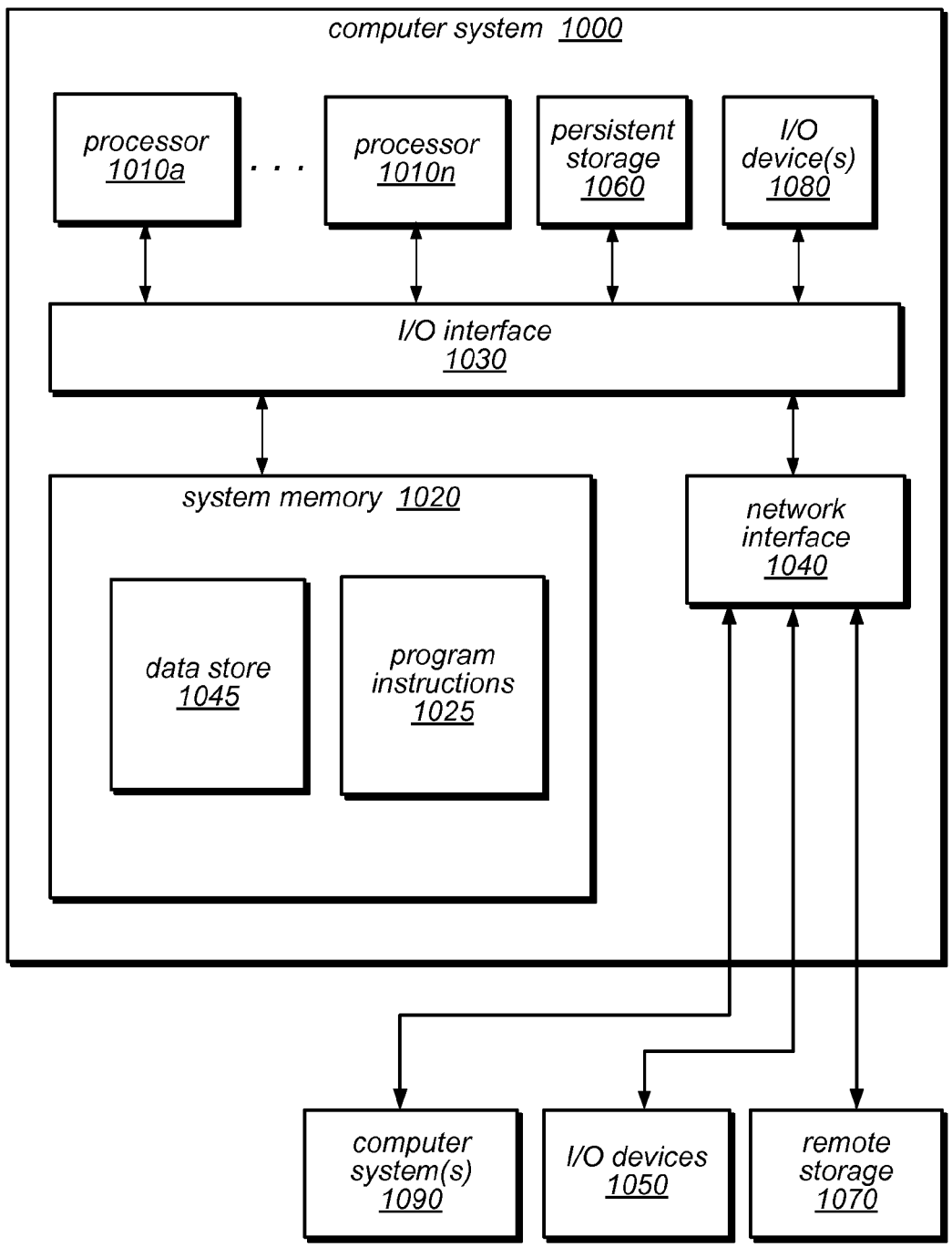
FIG. 9 illustrates an example system, according to some embodiments.

Clients 350a-350n, similar to clients 250a-250n discussed above with regard to FIG. 2 may communicate with a distributed data warehouse cluster 225 or 235 via a desktop computer, laptop computer, tablet computer, personal digital assistant, mobile device, server, or any other computing system or other device, such as computer system 1000 described below with regard to FIG. 9, configured to send requests to the distributed data warehouse clusters 325 and 335, and/or receive responses from the distributed data warehouse clusters 325 and 335. Such request may be directed through distribute data warehouse service manager 302, which may be included as part of a larger network-based services platform, such as network-based services platform 200 discussed above with regard to FIG. 2, or a separate service manager/control plane. Requests may also be communicated directly to distributed data warehouse clusters 325 and 335. Requests, for example may be formatted as a message that includes parameters and/or data associated with a particular function or service offered by a data warehouse cluster. Such a message may be formatted according to a particular markup language such as Extensible Markup Language (XML), and/or may be encapsulated using a protocol such as Simple Object Access Protocol (SOAP). Application programmer interfaces (APIs) may be implemented to provide standardized message formats for clients, such as for when clients are communicating with distributed data warehouse service manager 302.

Clients 350a through 350n may communicate with distributed data warehouse clusters 325 and 335, hosted by distributed data warehouse service 380 using a variety of different communication methods, such as over Wide Area Network (WAN) 360 (e.g., the Internet). Private networks, intranets, and other forms of communication networks may also facilitate communication between clients and distributed data warehouse clusters. A client may assemble a message including a request and convey the message to a network endpoint (e.g., a Uniform Resource Locator (URL)) corresponding to the data warehouse cluster). For example, a client 350a may communicate via a desktop computer running a local software application, such as a web-client, that is configured to send hypertext transfer protocol (HTTP) requests to distributed data warehouse cluster 325 over WAN 360. Responses or other data sent to clients may be formatted in similar ways.

In at least some embodiments, a distributed data warehouse service, as indicated at 380, may host distributed data warehouse clusters, such as clusters 325 and 335. The distributed data warehouse service 380 may provide network endpoints to the clients 350a to 350n of the clusters which allow the clients 350a through 350n to send requests and other messages directly to a particular cluster. As noted above, network endpoints, for example may be a particular network address, such as a URL, which points to a particular cluster. For example, client 350a may be given the network endpoint "http://mycluster.com" to send various request messages to. Multiple clients (or users of a particular client) may be given a network endpoint for a particular cluster. Various security features may be implemented to prevent unauthorized users from accessing the clusters. Conversely, a client may be given network endpoints for multiple clusters.

Distributed data warehouse clusters, such as distributed data warehouse cluster 325 and 335, may be made up of one or more nodes. These clusters may include different numbers of compute nodes. A compute node may be a server, desktop computer, laptop, or, more generally any other computing device, such as those described below with regard to computer system 1000 in FIG. 9. In some embodiments, the number of nodes in a distributed data warehouse cluster may be modified, such as by a cluster scaling request.

Nodes of a distributed data warehouse cluster may implement one or more data slices for storing data. In some embodiments these data slices may be partitions, shards, or other distributions of data stored for clients. Data maintained on a slice may be determined according to a data distribution scheme, which may provide a load balancing effect for performing client requests among the compute nodes. For example, for a database table, a distribution key value (e.g., a particular column for a record) may be used as part of hashing technique to distribute records among the different slices on maintained at the different compute nodes. More generally, a data distribution scheme may be used to determine locations of data currently stored and data to be stored or uploaded among the slices of the compute nodes in a data warehouse cluster. These data slices may be part of storage devices, such as the disk storage devices discussed below with regard to FIG. 4.

In some embodiments, distributed data warehouse service 380 may be implemented as part of a network-based service, such as network-based services platform 200 discussed above with regard to FIG. 2, that allows users to set up, operate, and scale a data warehouse in a cloud computing environment. In various embodiments, the distributed data warehouse clusters hosted by the network-based service may provide an enterprise-class database query and management system that allows users to scale the clusters, such as by sending a cluster scaling request to a cluster control interface implemented by the network-based service as part of the distributed data warehouse service manager. Scaling clusters may allow users of the web service to perform their data warehouse functions, such as fast querying capabilities over structured data, integration with various data loading and ETL (extraction, transformation, and load) tools, client connections with best-in-class business intelligence (BI) reporting, data mining, and analytics tools, and optimizations for very fast execution of complex analytic queries such as those including multi-table joins, sub-queries, and aggregation, more efficiently.

In various embodiments, distributed data warehouse service 380 may provide clients (e.g., subscribers to the data warehouse service provided by the distributed data warehouse system) with data storage and management resources that may be created, configured, managed, scaled, and terminated in response to requests from the client. For example, in some embodiments, distributed data warehouse system 380 may provide clients of the system with distributed data warehouse clusters composed of virtual compute nodes. These virtual compute nodes may be nodes implemented by virtual machines, such as hardware virtual machines, or other forms of software implemented to simulate hardware configurations. Virtual nodes may be configured to perform the same tasks, functions, and/or services as nodes implemented on physical hardware.

Distributed data warehouse service 380 may be implemented by a large collection of computing devices, such as customized or off-the-shelf computing systems, servers, or any other combination of computing systems or devices, such as the various types of devices described below with regard to FIG. 9. Different subsets of these computing devices may be controlled by distributed data warehouse service manager 302. Distributed data warehouse service manager 302, for example, may provide a management console or cluster control interface to clients, such as clients 350a through 350n, or any other clients or users who wish to interact with the distributed data warehouse clusters managed by the distributed data warehouse service manager 302, which in this example illustration would be distributed data warehouse clusters 325 and 335. In at least some embodiments, the management console or cluster control interface may provide clients 350a-350n an interface through which clients 350a-350n may submit requests to set up, operate, and scale a data warehouse. For example, distributed data warehouse service manager 302 may generate one or more graphical user interfaces (GUIs) for storage clients, which may then be utilized to select various control functions offered by the control interface for the distributed data warehouse clusters hosted in the distributed data warehouse service 380. In some embodiments, the management console or interface of distributed data warehouse service manager 302 may implement a dynamic, multi-part upload module, as described below in FIG. 5, to perform dynamic multi-part upload for data into a data warehouse cluster, and receive various indications and selections from a storage client, such as a selection of particular data file to upload, or selection of a particular data warehouse cluster into which the data may be uploaded.

Figure 4:
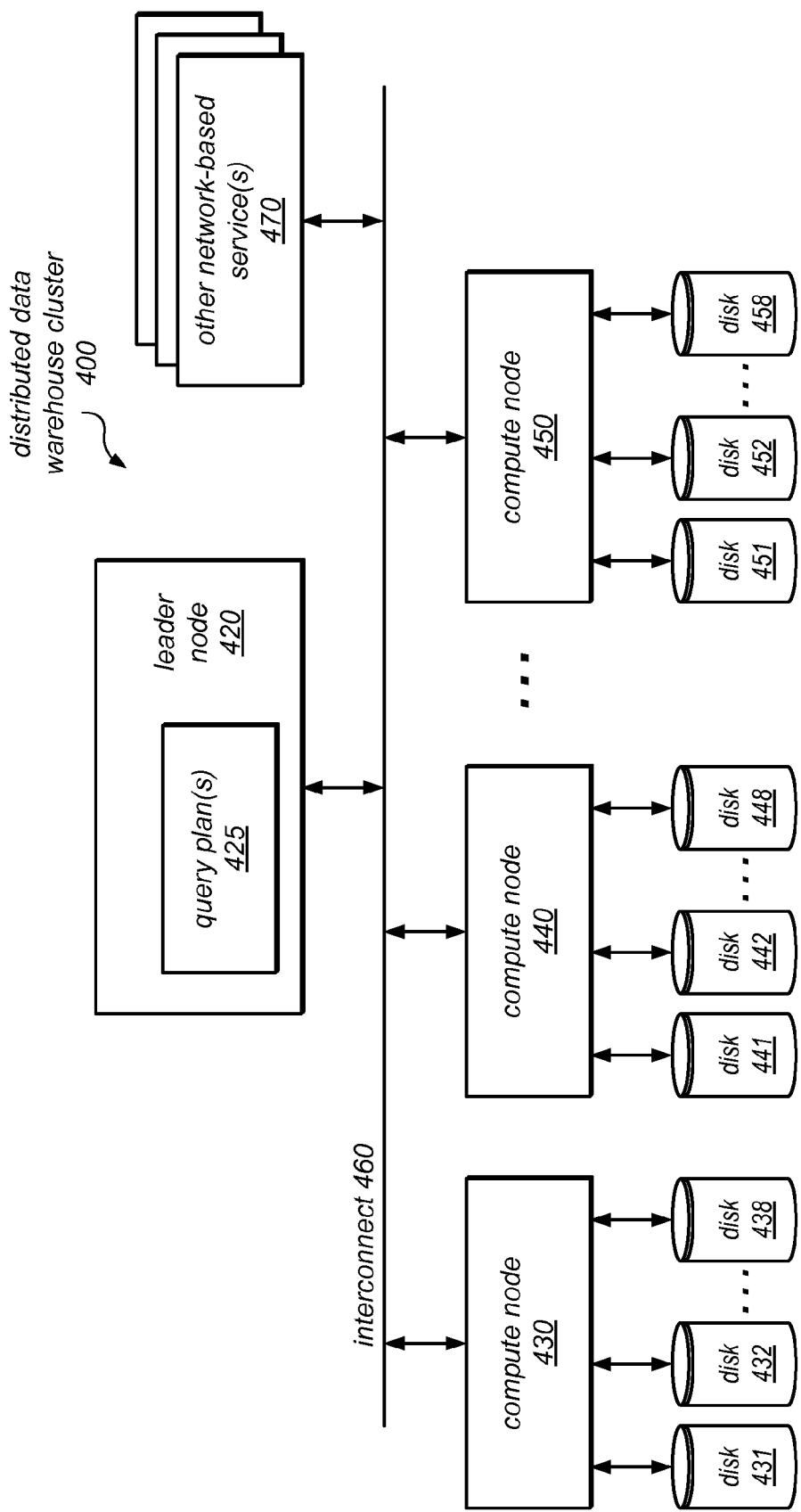
FIG. 4 is a block diagram illustrating an example data warehouse cluster, according to some embodiments.

FIG. 4 is a block diagram illustrating a distributed data warehouse cluster in a distributed data warehouse service, according to some embodiments. As illustrated in this example, a distributed data warehouse cluster 400 may include a leader node 420 and compute nodes 430, 440, and 450, which may communicate with each other over an interconnect 460. Leader node 420 may generate and/or maintain one or more query plans 425 for executing queries on distributed data warehouse cluster 400. As described herein, each node in a distributed data warehouse cluster may include multiple disks on which data blocks may be stored on behalf of clients (e.g., users, client applications, and/or distributed data warehouse service subscribers). In this example, compute node 430 includes disks 431-438, compute node 440 includes disks 441-448, and compute node 450 includes disks 451-458. In some embodiments, a component of the distributed data warehouse cluster (or the distributed data warehouse system of which it is a component) may support load balancing, using any of a variety of applicable load balancing techniques. For example, in some embodiments, leader node 420 may include a load balancing component (not shown). Load balancing workload among compute nodes 430, 440, and 450 may also include implementing a data distribution scheme.

In at least some embodiments, distributed data warehouse cluster 400 may be implemented as part of the network-based data warehouse service, such as the one described above with regard to FIGS. 2 and 3, and includes a leader node 420 and multiple compute nodes, such as compute nodes 430, 440, and 450. The leader node 420 may manage communications with clients, such as clients 250a through 250n discussed above with regard to FIG. 2 and/or clients 350a-350n discussed above with regard to FIG. 3. For example, a leader node may be a server that receives requests from various client programs (e.g., applications) and/or subscribers (users), then parses them and develops an execution plan (e.g., query plan(s) 425) to carry out the associated database operation(s). More specifically, the leader node may develop the series of steps necessary to obtain results for complex queries and joins. Leader node 420 may also manage the communications among compute nodes 430 through 450 instructed to carry out database operations for data stored in the distributed data warehousing cluster 400. For example, compiled code may be distributed by leader node 420 to various ones of the compute nodes 430 to 450 to carry out the steps needed to perform queries, and intermediate results of those queries may be sent back to the leader node 420. Leader node 420 may receive data and query responses or results from compute nodes 430, 440, and 450. A database schema and/or other metadata information for the data stored among the compute nodes, such as the data tables stored in the cluster, may be managed and stored by leader node 420.

Distributed data warehousing cluster 400 may also include compute nodes, such as compute nodes 430, 440, and 450. These one or more compute nodes, may for example, be implemented on servers or other computing devices, such as those described below with regard to computer system 1000 in FIG. 9, and each may include individual query processing "slices" defined, for example, for each core of a server's multi-core processor. Compute nodes may perform processing of database operations, such as queries, based on instructions sent to compute nodes 430, 440, and 450 from leader node 420. The instructions may, for example, be compiled code from execution plan segments and steps that are executable by the particular data compute node to which it is sent. Data compute nodes may send intermediate results from queries back to leader node 420 for final aggregation. Each data compute node may be configured to access a certain memory and disk space, such as illustrated in FIG. 4, in order to process a portion of the workload for a query (or other database operation) that is sent to one or more of the compute nodes 430, 440 or 450. Thus, compute node 430, for example, may access disk 431, 432, up until disk 438. In at least some embodiments, compute nodes 430, 440, and 450 may not be accessible to clients of the distributed data warehouse cluster 400. For example, clients may rely upon requests sent to the leader node 420 to provide instructions to compute nodes 430, 440, and 450. In the case of a multi-part upload, a copy or other type of multi-part upload request to obtain data may be sent to leader node 420, which may then determine which compute nodes may be instructed to obtain different parts of data to be uploaded from a data staging area, as discussed in more detail FIGS. 5A, 5B and 6 below.

Disks, such as the disks 431 through 458 illustrated in FIG. 4, may be may be implemented as one or more of any type of storage devices and/or storage system suitable for storing data accessible to the data compute nodes, including, but not limited to: redundant array of inexpensive disks (RAID) devices, disk drives or arrays of disk drives such as Just a Bunch Of Disks (JBOD), (used to refer to disks that are not configured according to RAID), optical storage devices, tape drives, RAM disks, Storage Area Network (SAN), Network Access Storage (NAS), or combinations thereof. In various embodiments, disks may be formatted to store columnar database tables through various column-oriented database schemes.

Other network-based services 470, such as those various services described above with regard to FIG. 2, may, in some embodiments, be also configured to communicate with different components of distributed data warehouse cluster 400 over interconnect 460. For example, compute nodes 430, 440, and/or 450 may be configured to communicate with another network-based service 470 that maintains data to be uploaded to the compute nodes 430, 440, and 450, in an upload staging area. In another example, other network-based services 470 may send or receive from leader node 420 requests to perform a multi-part upload of data from an upload storage area maintained by another network-based service 470.

In some embodiments, each of the compute nodes in a distributed data warehouse cluster may implement a set of processes running on the node server's (or other computing device's) operating system that manage communication with the leader node, e.g., to receive commands (such as an upload or copy command), send back data, and route compiled code to individual query processes (e.g., for each core or slice on the node) in order to execute a given query. In some embodiments, each of compute nodes includes metadata for the blocks stored on the node. In at least some embodiments this block metadata may be aggregated together into a superblock data structure, which is a data structure (e.g., an array of data) whose entries store information (e.g., metadata about each of the data blocks stored on that node (i.e., one entry per data block). In some embodiments, each entry of the superblock data structure includes a unique ID for a respective block, and that unique ID may be used to perform various operations associated with data block. For example, indications of column-specific compression techniques applied to the data stored in the data block, indications of default compression techniques applied to the data stored in the data block, or probabilistic data structures that indicate data values not stored in a data block may all be stored in the respective entry for a data block. In some embodiments, the unique ID may be generated (and a corresponding entry in the superblock created) by the leader node or by a computing node when the data block is first written in the distributed data warehouse system.

As discussed above with regard to FIG. 1, in various embodiments, at least some of the compute nodes in a data warehouse cluster may not be accessible to a client of the data warehouse. In order to upload a data file, clients would typically send data to a leader node of a data warehouse cluster, which would then send data to the appropriate compute node for storage according to a data distribution scheme. However, by implementing dynamic, multi-part upload for a data warehouse, in various embodiments, large data files may be directly uploaded to their respective compute nodes according to the data distribution scheme, allowing the compute nodes themselves to operate in parallel. Multi-part upload may thus result in a more efficient transport of a data file to a data warehouse cluster. A dynamic, multi-part upload module may, in various embodiments, be implemented as part of a storage client, or other system in order to implement various different methods or techniques for dynamic, multi-part upload for a data warehouse cluster. FIG. 5 illustrates an example dynamic multi-part upload module, according to some embodiments.

A dynamic, multi-part upload module 510 may be any combination of hardware and/or software configured to perform dynamic multi-part upload for a data warehouse cluster. In various embodiments, storage client 570, (such as clients 250 and 350 described above with regard to FIGS. 2 and 3), may receive, implement, download, or be instructed to perform the various functions illustrated as part of dynamic multi-part upload module 510. Client-side data storage 500 may be local, block-based or persistent data storage accessible to a storage client and/or dynamic multi-part upload module 510. In some embodiments, client-data storage 500 may be an I/O device configured to read data from a storage medium, such as a flash-based USB drive, or a DVD-ROM.

Data may be identified for upload (e.g., via selection at storage client and/or indication of selection sent to data warehouse cluster control interface 562, or other system of data warehouse service 560) to a data warehouse cluster. The identified data may be obtained 502 from client-side data storage 500 and received at dynamic multi-part upload module 510. In some embodiments, dynamic multi-part upload module 510 may implement a data warehouse cluster information module 522 in order to obtain information about the data warehouse cluster 564 to which the data is to be uploaded. Data warehouse cluster information module 522 may be configured to obtain and/or maintain information about respective data warehouse clusters sufficient to perform dynamic multi-part uploads to the data warehouse clusters. For example, in some embodiments, data warehouse cluster information module 522 may store data distribution schemes for respective data warehouse clusters, such as the number of compute nodes in a cluster, the number of data slices at each compute node, and/or the distribution technique for distributing data among the compute nodes for the data warehouse cluster. In some embodiments, data warehouse cluster information, such as the data warehouse cluster's data distribution scheme, may be determined based on pre-defined data distribution schemes for various types of data warehouse clusters (as may be specified in the selection of a specific data warehouse cluster). In some embodiments, information about the select data warehouse cluster 564 may be obtained from data warehouse cluster control interface 562 (which data warehouse cluster information module 522 may be configured to communicate with) and sent to data warehouse cluster information module 522.

Figure 8:
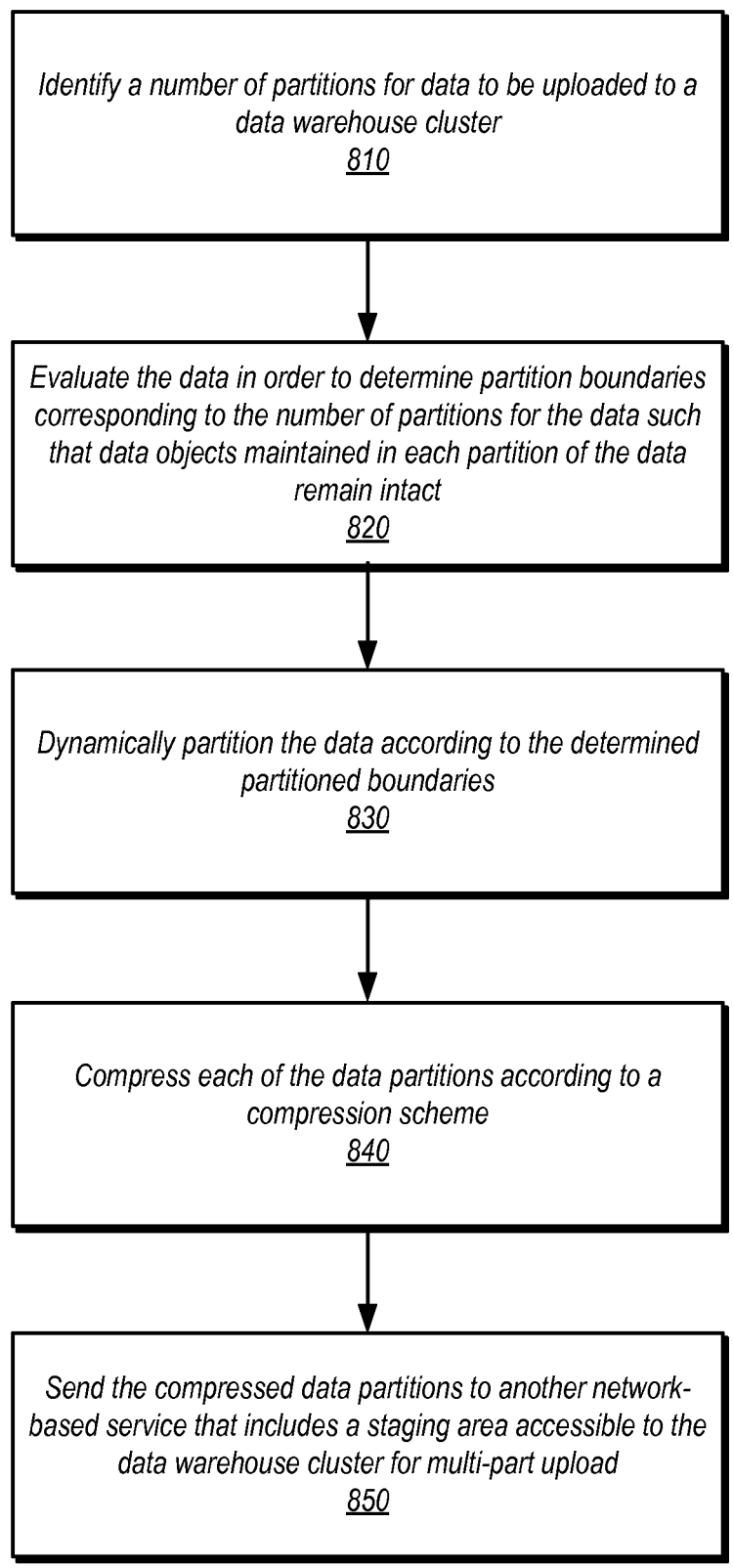
FIG. 8 is a high-level flowchart illustrating various methods and techniques to implement dynamic partitioning of data for a multi-part upload to a data warehouse, according to some embodiments.

In at least some embodiments, dynamic multi-part upload module 510 may implement data partition analyzer 520. Data partition analyzer 520 may be configured to determine a number, as well as location, of partitions to be made in data for multi-part upload. For example, in some embodiments, the number of data partitions may be identified based, at least in part, on the number of locations at which the data may be apportioned among the compute nodes of the data warehouse cluster. If, for instance, a data warehouse cluster has 4 compute nodes, each of which maintains 4 data slices, then data partition analyzer may determine that 16 partitions (or a multiple of 16 partitions) may be made of the data. Data partition analyzer 520 may also be configured to determine locations or boundaries for partitions of the data to occur, in some embodiments. These partition boundaries may preserve the integrity of data objects, such as data records, entries, rows, etc. . . . , in the different partitions. Thus, in some embodiments, data partition analyzer 520 may evaluate portions of the data at or near potential partition boundaries (e.g., such as at or near partition boundaries for diving the data into equal or near-equal parts) to locate partition boundaries that allow data objects within the data partition to remain intact. FIG. 8, discussed below, provides further examples of the various ways in which evaluation and analysis of data to determine partition boundaries/locations may be performed, which may be implemented as part of data partition analyzer 520.

In various embodiments, dynamic, multi-part upload module 510 may implement partition engine 530. Partition engine 530 may be configured to partition data "on-the-fly" according to the determined partition boundaries/locations. Thus, for example, if a data file is determined to be partitioned at locations 10000, 20012, 30032, and 40004, then partition engine 530 may be configured to partition the data file into separate partitions at these locations. Partition engine 530 may be configured to partition data in system memory, such as the system memory of storage client 570, so that no locally persistent partitions of the data need be created. Partition engine 530 may, for example, instantiate multiple execution threads for each partition to handle partitioning each portion of the data.

In some embodiments, dynamic multi-part upload module 510 may implement one or more other modules to modify partitions of the data sent to network-based service 550. Data encryption or analysis of data in the partitions may be performed, in some embodiments. In another example, in some embodiments, dynamic multi-part upload module 510 may implement compression engine 540 in order to generate compressed versions of data partitions. These data partitions may be compressed "on-the-fly" similar to the data partitions by compression engine 540 according to one or more compression techniques, such as B-zip, Lempel-Ziv, run-length encoding, data dictionary encoding, or some other loss-less data compression technique.

In various embodiments data partitions 504 may be sent in parallel to network-based service 550, which may be implemented as part of network-based services platform 580 (similar to network-based services platform 200 discussed above with regard to FIG. 2) which also implements data warehouse service 560. Network-based services 550 may include an upload staging area 552 to which the data partitions 504 may be sent.

Figure 6A:
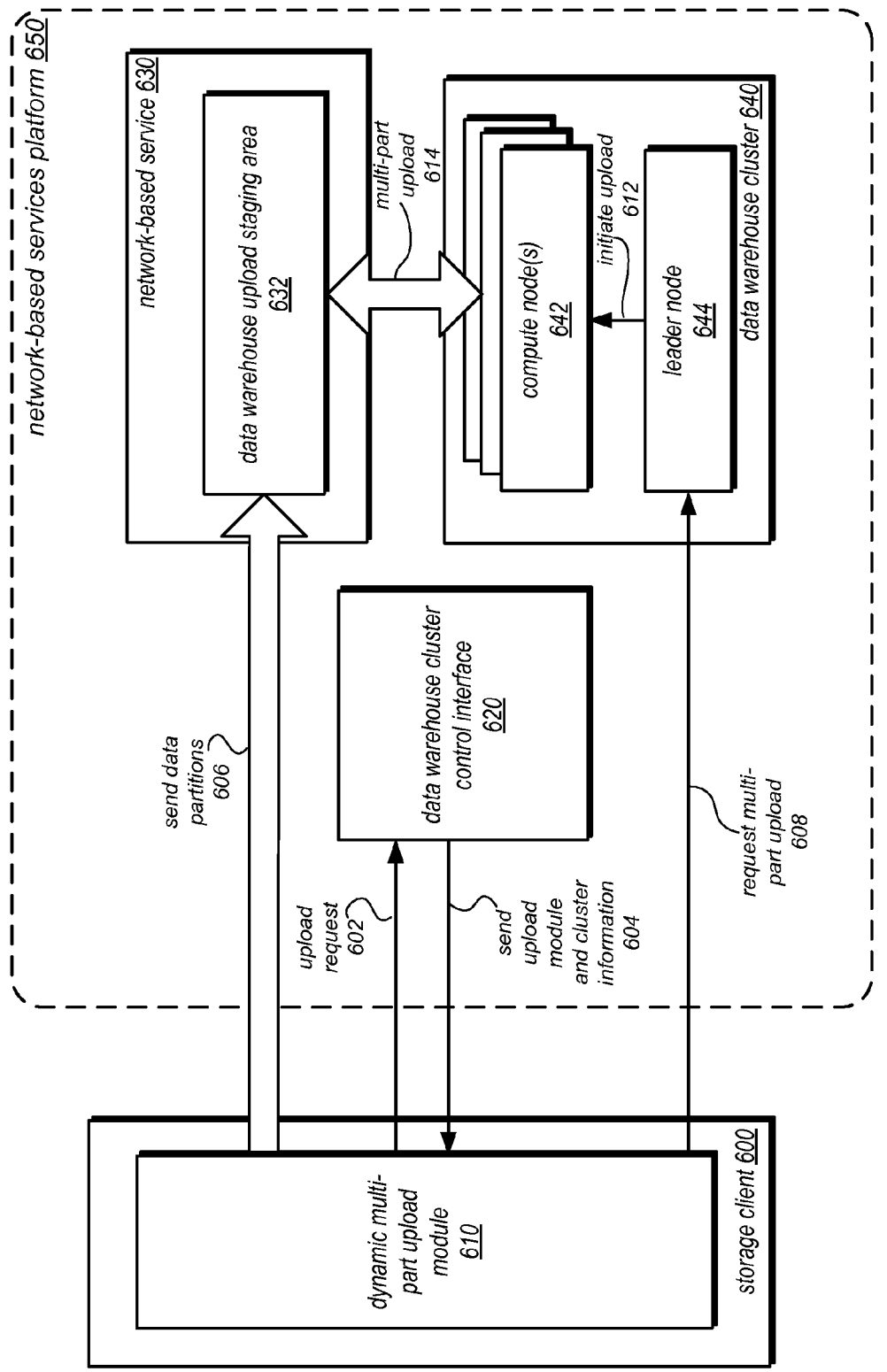
FIGS. 6A, 6B and 6C are a block diagrams illustrating example implementations for dynamic multi-part upload modules, according to some embodiments.
Figure 6B:
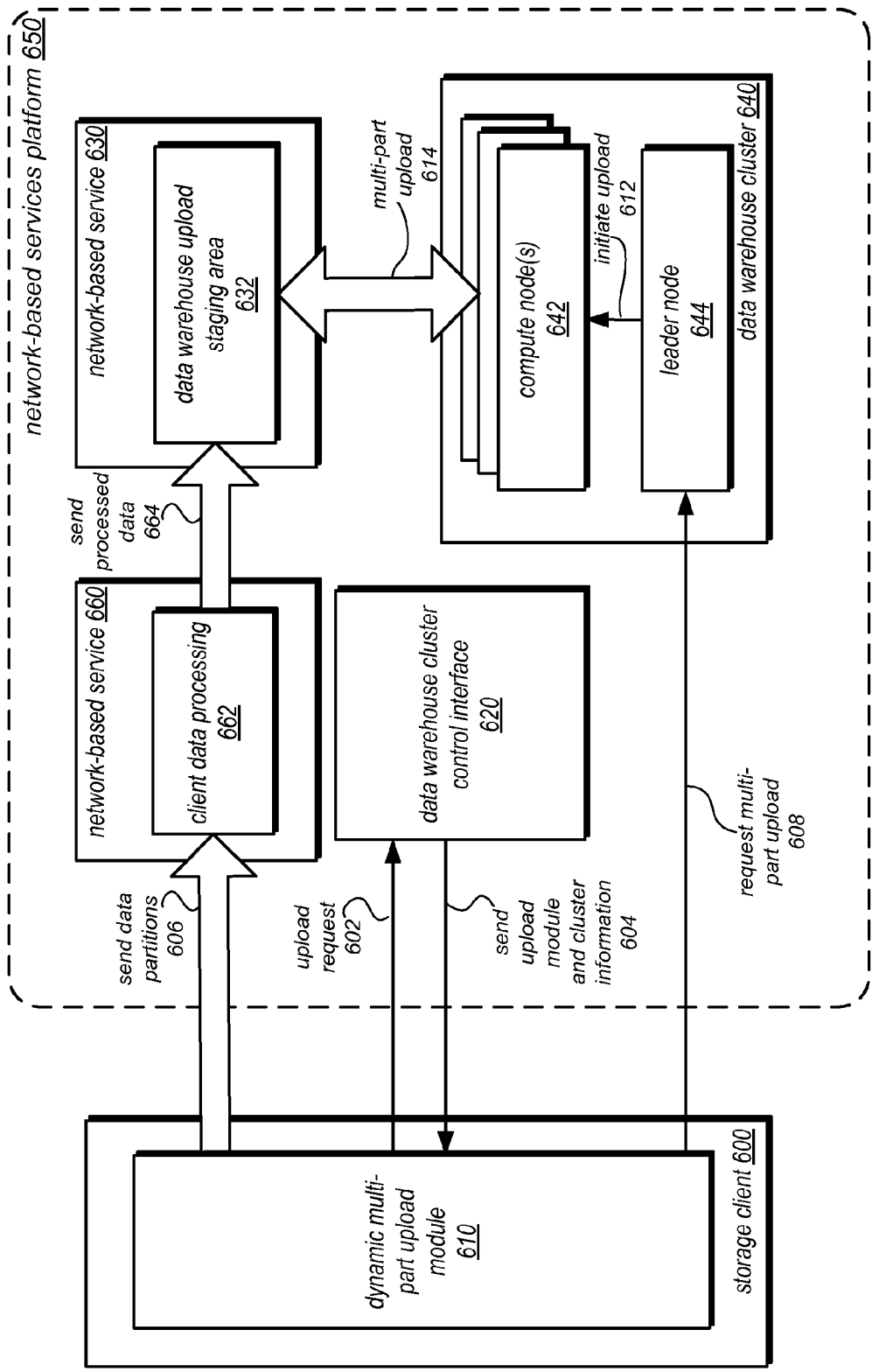
Figure 6C:
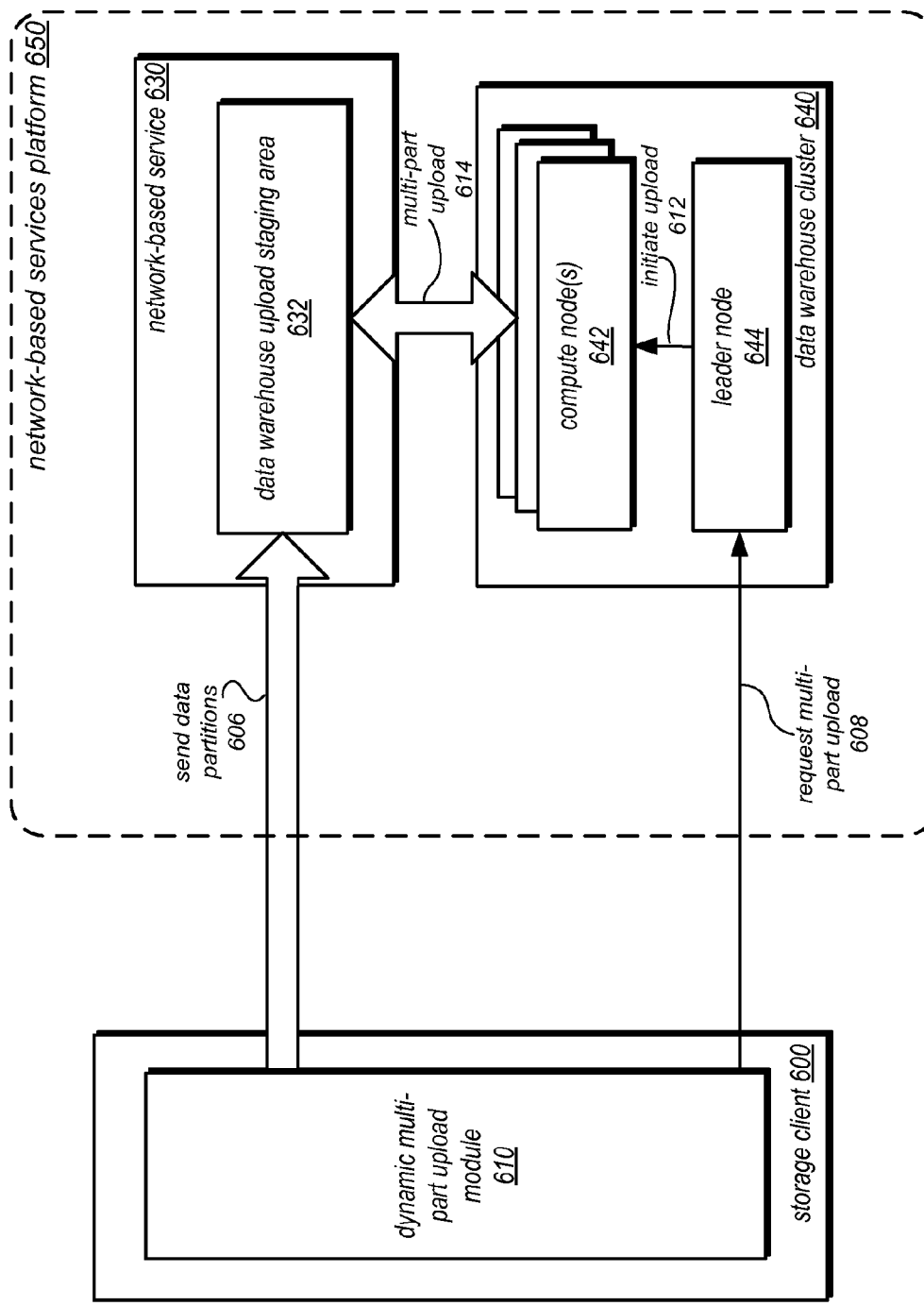

Dynamic, multi-part, upload module 510 may be implemented in different ways. In some embodiments, at least some of the illustrated functionality may be implemented as part of a data warehouse cluster control interface, control plane, or other system, node, or device implemented at the network-based services platform 580, or downloaded, directed, instantiated, or installed as part of storage client 570. FIGS. 6A through 6C discussed below, illustrate some of the different ways in which a dynamic multi-part upload module may be implemented in order to provide dynamic, multi-part upload for data to a data warehouse cluster.

Turning to FIG. 6A, storage client 600 may be a node, system, or device, such as clients 250 and 350 described above with regard to FIGS. 2 and 3, that may interact with data warehouse cluster 640, which may provide data storage for storage client 600. Data warehouse cluster 640 may be implemented as part of a network-based services platform 650 which may provide services via a network to one or more clients, such as storage client 600. Data warehouse cluster 640 may implement leader node 644, providing a single point of access to data warehouse cluster 640, as well as compute nodes 642, among which data stored for storage client 600 may be distributed according to a data distribution scheme.

In order to initiate a multi-part upload of data stored locally at storage client 600 to data warehouse cluster 640, an upload request 602 may be sent data warehouse cluster control interface 620. Data warehouse cluster control interface 620 may be implemented as part of a data warehouse services manager, such as illustrated above in FIG. 3, or some other control plane for data warehouse cluster 640. In at least some embodiments, data warehouse cluster control interface 620 may provide a graphical user interface, such as a console, via which a storage client may provide selections. For example, data cluster control interface 620 may host web-based interface, which a network-browser or other type of application implemented at storage client 600 may convey indications of selections, such as the selection of a particular file to be uploaded in upload request 602. In some embodiments, upload request 602, may also specify data warehouse cluster 640 (as opposed to another data warehouse cluster that may be implemented by a data warehouse service.

In response to the upload request, data warehouse cluster control interface may send dynamic multi-part upload module 610 and cluster information 604. For example, in some embodiments, the upload request may trigger the generation of a customized application for the specific data warehouse cluster upload that may be downloaded to storage client 600. Java script, for instance, may be implemented as part of a web-page console for the data interface so that the various functions of the dynamic, multi-part upload module 610 may be performed at storage client 600. In some other embodiments, server-side code, or some other type of server-side control may be implemented as part of data cluster control interface 620 in order to direct, instantiate, and/or perform the various functions of a dynamic, multi-part upload module 610.

Figure 7:
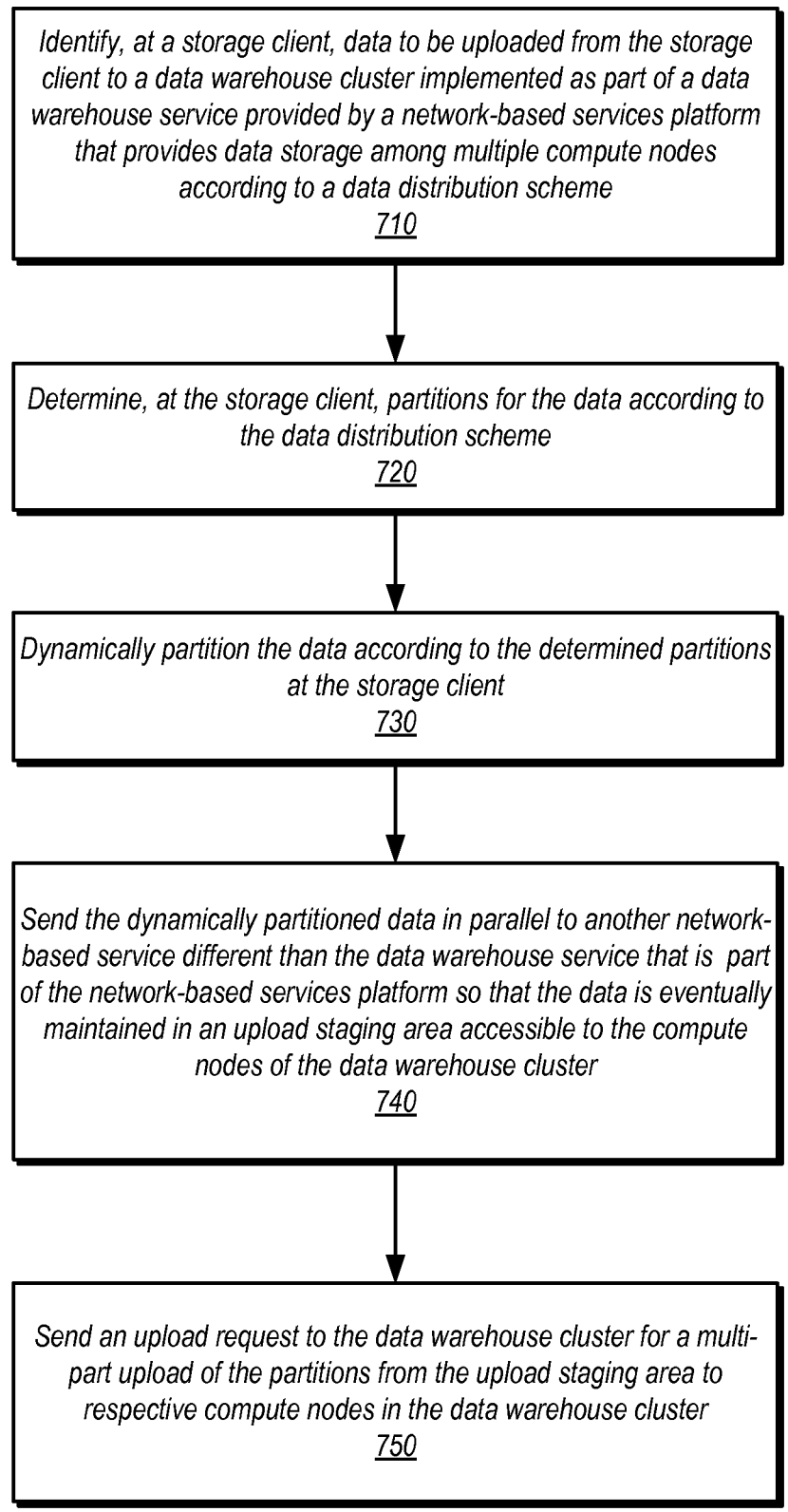
FIG. 7 is a high-level flowchart illustrating various methods and techniques for implementing dynamic multi-part upload for a data warehouse, according to some embodiments.

Cluster information may be used in order to perform the determination of partitions of for the selected data, as described below with regard to FIGS. 7 and 8. The cluster information 604 may be obtained, received, or managed, such as discussed above with regard to data warehouse cluster information module 522 in FIG. 5, in order for dynamic multi-part upload module 610 dynamically partition the data. Dynamically partitioned data may be sent 606 network-based service 630 which may be a storage or other data processing service also implemented as part of network-based services platform 650. Data partitions may be sent in parallel to data warehouse upload staging area 632 to be persisted until upload to data warehouse cluster 640.

In at least some embodiments, dynamic multi-part module 610 may send a multi-part upload request to leader node 644, which may indicate the data, as well as the location, such as data warehouse upload staging area 632 from which an multi-part data upload may be performed directly into compute nodes 642. As illustrated in FIG. 6A, leader node 644 may initiate the upload 612 to compute nodes 642. In various embodiments, compute nodes may initiate respective upload requests, and perform various transfer protocols in order to obtain 614 the respective portions of the dynamically partitioned data from data warehouse upload staging area 632. Further modification of data, such as compression or encryption may occur before or after upload 612 from upload staging area 632 to compute nodes 642. The different compute nodes 642 may perform upload in parallel or near-parallel. In some embodiments, sending data partitions 606 and requesting multi-part upload 608 may be performed dynamically for portions of a data file at a time, such that dynamic multi-part upload may be performed multiple times for very large data files.

FIG. 6B illustrates a similar implementation of dynamic, multi-part upload module 610. However, in FIG. 6B, multiple network-based services may receive the dynamically partitioned data from the storage client before it is maintained at data warehouse upload staging area for upload into a data warehouse cluster. As discussed above, data warehouse cluster 640 may be implemented as part of a network-based services platform 650 which may provide services via a network to one or more clients, such as storage client 600. Data warehouse cluster 640 may implement leader node 644, providing a single point of access to data warehouse cluster 640, as well as compute nodes 642, among which data stored for storage client 600 may be distributed according to a data distribution scheme.

In order to initiate a multi-part upload of data stored locally at storage client 600 to data warehouse cluster 640, an upload request 602 may be sent data warehouse cluster control interface 620. The upload request may also specify the network-based services to which the data may be sent initially, such as network-based service 660, as well as ultimately the network-based service which may maintain the dynamically partitioned data in an data warehouse upload staging area. Data warehouse cluster control interface 620 may be implemented as part of a data warehouse services manager, such as illustrated above in FIG. 3, or some other control plane for data warehouse cluster 640. In at least some embodiments, data warehouse cluster control interface 620 may provide a graphical user interface, such as a console, via which a storage client may provide selections. For example, data cluster control interface 620 may host web-based interface, which a network-browser or other type of application implemented at storage client 600 may convey indications of selections, such as the selection of a particular file to be uploaded in upload request 602. In some embodiments, upload request 602, may also specify data warehouse cluster 640 (as opposed to another data warehouse cluster that may be implemented by a data warehouse service.

In response to the upload request, data warehouse cluster control interface may send dynamic multi-part upload module 610 and cluster information 604. For example, in some embodiments, the upload request may trigger the generation of a customized application for the specific data warehouse cluster upload that may be downloaded to storage client 600. Java script, for instance, may be implemented as part of a web-page console for the data interface so that the various functions of the dynamic, multi-part upload module 610 may be performed at storage client 600. In some other embodiments, server-side code, or some other type of server-side control may be implemented as part of data cluster control interface 620 in order to direct, instantiate, and/or perform the various functions of a dynamic, multi-part upload module 610.

Cluster information may be used in order to perform the determination of partitions of for the selected data, as described below with regard to FIGS. 7 and 8. The cluster information 604 may be obtained, received, or managed, such as discussed above with regard to data warehouse cluster information module 522 in FIG. 5, in order for dynamic multi-part upload module 610 dynamically partition the data. Dynamically partitioned data may be sent 606 to network-based service 660 which may perform some processing service also implemented as part of network-based services platform 650. For example, network-based service 660 may implement client-data processing 662, which may perform various types of analysis, indexing, and/or simulation. Network-based service 660 may also provide some other type of transport (e.g., a streaming service), modification (e.g., encryption, compression), or other computing service for dynamically partitioned data prior to upload into data warehouse cluster 640. Data partitions may be sent in parallel to client data processing 662 at network-based service 660 for data processing. Upon completion of the processing, the client data may be sent on to network-based service 630 to be persisted in data warehouse upload staging area 632 until upload to data warehouse cluster 640. In at least some embodiments, the dynamically partitioned data may be divided again, combined, and/or reorganized into one or more partitions different than those generated by dynamic multi-part upload module.

Again, as discussed above, in at least some embodiments, dynamic multi-part module 610 may send a multi-part upload request to leader node 644, which may indicate the data, as well as the location, such as data warehouse upload staging area 632 from which an multi-part data upload may be performed directly into compute nodes 642. As illustrated in FIG. 6B, leader node 644 may initiate the upload 612 to compute nodes 642. In various embodiments, compute nodes may initiate respective upload requests, and perform various transfer protocols in order to obtain 614 the respective portions of the dynamically partitioned data from data warehouse upload staging area 632. Further modification of data, such as compression or encryption may occur before or after upload 612 from upload staging area 632 to compute nodes 642. The different compute nodes 632 may perform upload in parallel or near-parallel.

FIG. 6C illustrates another example of a dynamic multi-part upload module implemented in order to upload data to a data warehouse, according to some embodiments. Storage client 600 may implement dynamic, multi-part upload module 610. This dynamic, multi-part upload module 610 may be obtained asynchronously from a data warehouse service implementing the data warehouse cluster 640, or some other node, system, or device implemented as part of the network-based services platform 650. In a least some embodiments, dynamic, multi-part upload module 610 may be implemented as part of a stand-alone application at storage client 600.

An identification of the data to be uploaded to data warehouse cluster 640 may be made, the partitions of the data determined, and the data dynamically partitioned at dynamic multi-part upload module 610. As indicated at 606 the dynamically partitioned data may be sent in parallel to network-based service 630 to be maintained in data warehouse upload staging area 632. A request may then be made 608 to leader node 644 to perform multi-part upload for the data. Leader node 644 may initiate upload 612 of the data from data warehouse upload staging area 632, providing a parallel, multipart upload 614 of the data into respective compute nodes 642 of data warehouse cluster 640.

Please note, that examples, described above in FIGS. 6A-6C are not intended to be limiting as to the various other locations, means, or components of a storage client or network-based services platform which may implement a dynamic multi-part upload module in order to upload data to a data warehouse cluster.

Although FIGS. 2 through 6 have been described and illustrated in the context of a distributed data warehousing service, the various components illustrated and described in FIGS. 2 through 6 may be easily applied to other data management systems that provide data management and/or storage services for a storing data in a data store. For example the illustrated storage devices or disks need not be configured as columnar database tables, but may instead implement traditional row-oriented database tables. Moreover, the configuration of components, systems, or devices show are not limiting as to other possible configurations. As such, FIGS. 2 through 6 are not intended to be limiting as to other embodiments of a distributed data warehouse cluster, nor limiting a description of a data storage and management cluster.

Data warehouse clusters may often provide a single point of access, such as a single leader node, for storage clients who wish to upload data to the data warehouse cluster. For larger data amounts of data, this single point of access may create a bottleneck for uploading data, which may be ultimately stored among multiple different compute nodes in the data warehouse cluster. Other network-based services that may be provided as part of the same network-based services platform as the data warehouse cluster, may be configured to access the multiple compute nodes of the data warehouse cluster that may not be accessible to a storage client. Such network-based storage services may also be configured to provide multiple access points to a storage client, such that a multi-part upload may be performed in parallel from a storage client. However, a storage client may still have to partition the data into multiple parts that may be uploaded in parallel to the network-based service, which may in turn provide the partitioned data to the data warehouse clusters in parallel. FIG. 7 is a high-level flowchart illustrating various methods and techniques for implementing dynamic multi-part upload for a data warehouse, according to some embodiments.

In various embodiments, a dynamic multi-part upload module, such as illustrated above in FIGS. 5, 6A, 6B, and 6C, may implement the various methods and techniques discussed below. A dynamic multi-part upload module may be implemented on a storage client, such as illustrated above in FIG. 6C, downloaded to, generated and sent, or instantiated on a storage client, such as via a data warehouse cluster control interface, network-based services console, or some other service, interface, module, system, node, or device, such as illustrated above in FIGS. 6A and 6B.

As indicated at 710, data may be identified at a storage client that is to be uploaded from the storage client to a data warehouse cluster implemented as part of a data warehouse service provided by a network-based storage services platform that provides data storage among multiple compute nodes according to a data distribution scheme. A storage client may be any system, application, node, device, or other any other type of computing system, such as computing system 1000 described below with regard to FIG. 9. For example, the storage client may, as discussed above, may include a suitable version of a web browser, or may include a plug-in module or other type of code module configured to execute as an extension to or within an execution environment provided by a web browser to access a data warehouse cluster control interface, network-based services platform console, or some other form of interface that may provide indications of selections, commands, etc. . . . to a dynamic multi-part module, or some other module, configured to perform dynamic, multi-part data upload to a data warehouse cluster.

In various embodiments, a particular data file may be selected by a storage client, such as via the dynamic multi-part upload module, which may provide a client interface, or some other means of identifying the data to be uploaded. In some embodiments, a cluster control interface, such as provided via a graphical user interface exposed to a storage client and at which selections of a particular data file to be uploaded may be provided to the cluster control interface (or some other interface, console, or control plane for the data warehouse cluster and/or a network-based services platform including the data warehouse cluster) for identification.

In various embodiments, data may be distributed among compute nodes for a data warehouse cluster, as discussed above, according to a data distribution scheme. In some embodiments, the data distribution scheme may determine which portions of data stored for a storage client are stored at individual compute nodes in the data warehouse cluster. For example, distribution key, or value, may be implemented as part of a distribution scheme to evenly (or near evenly) distribute data among the different compute nodes. In some embodiments, a distribution key may be particular column value for a database table (e.g., "primary key value," "Customer-ID," "Product-ID,"). The data distribution scheme may also indicate how data may also/further distributed into different portions among individual compute nodes. For example, in some embodiments, compute nodes may implement multiple data slices, as discussed above with regard to FIG. 4, each of which may maintain their own portion of data as determined according to the data distribution scheme.

In some embodiments, the data warehouse cluster may be one of many data warehouse clusters storing data for the storage client for which an indication of a selection of the database may be received. For example, the data warehouse service may allow storage clients to store data among different warehouse clusters. For example, each data warehouse cluster may store one or more related database tables, such as one or more columnar database tables. Data for the database tables in a particular cluster may be uploaded to a particular database. A storage client may provide some indication of a selection of a particular data warehouse cluster, such as may be selected by a user of a storage client, a default or determined cluster based on a data values or metadata associated with the file to be uploaded. This indication may, in some embodiments, be included in the identification of the data to be uploaded to the selected data warehouse cluster. For example, if the dynamic multi-part module, as illustrated in FIG. 6A discussed above, is downloaded to a storage client, then the upload request may include the specific data warehouse cluster to which the data is to be uploaded so that the dynamic multi-part upload module may be preconfigured to perform multi-part upload for the specific data warehouse cluster. For example, one data warehouse cluster may have a different data distribution scheme than another. If, for instance, a specified data cluster has 5 compute nodes, each with 4 slices, whereas a another data warehouse cluster has 8 compute nodes, each with 8 slices, then the dynamic multi-part upload module may be differently configured (or information for the specific data warehouse cluster may be included) to perform dynamic, multi-part upload to the specific data warehouse cluster's 5 compute nodes, and 4 respective slices each.

As indicated at 720, partitions for the data according to the data distribution scheme may be determined according to the data distribution scheme for the data warehouse cluster, in various embodiments. For example, in some embodiments, partitions may be determined that correspond to the number of different compute nodes and/or slices on compute nodes in a compute cluster (or a multiple of the number of different compute nodes and/or compute nodes in the data warehouse cluster). Consider the scenario where a data warehouse cluster implements a distribution scheme among 4 compute nodes, each with two data slices. Then, 8 partitions may be determined for the data warehouse cluster (or a multiple of 8 partitions, such as 16 partitions). Various other techniques for identifying and determining partitions of data to be uploaded may be used. FIG. 8 is a high-level flowchart illustrating various methods and techniques to implement dynamic partitioning of data for a multi-part upload to a data warehouse, according to some embodiments.

As indicated at 810, a number of partitions for data to be uploaded to a data warehouse cluster may be identified, in various embodiments. For example, in some embodiments, the number of partitions for a data warehouse cluster may be received from a data warehouse cluster control interface, network-based services console, control plane, or some other system or device configured to track and/or maintain information about data warehouse cluster configurations. Alternatively, in some embodiments, the number of partitions may be pre-determined, or default. For example, some data clusters may be identified as certain types (e.g., small, medium, large, etc.) which may be preconfigured to have certain number of compute nodes and/or slices. The number of partitions for a particular type of compute cluster may be known or included in a dynamic multi-part control module, or other system, implementing dynamic multi-part uploaded to a data warehouse cluster, in some embodiments.

As indicated at 820, the data may be evaluated to determine partition boundaries corresponding to the number of identified partitions for the data such that data objects maintained in each partition remain intact. For example, in some embodiments, a data file may include information for a database table. Each separate entry for a column in a record in the database table in the data file may be separated according to a delimiter (e.g. a comma or "1"). The end of an entire record (e.g., before a new row/record) may be identified by an end-of-line, carriage return, or other symbol or value (such as an ASCII or Unicode value). The data file may then be examined at boundary areas that create approximate or nearly equal partitions of the data according to the number of identified partitions in order to identify partition boundaries in the data file (e.g., the end of records, such as carriage returns, or the end of records, such as at delimiters). This may be performed for each partition so that each partition may include complete data that does not have to be recombined in order to be rightly read (e.g., the bytes that make up an individual entry in a row, or a row itself is not split so that it may not be completely whole). For example, if an entry contains a particular value, such as 16, the data for that entry such as a binary value "10000" may not be split apart. Similarly, in some embodiments, the data may be partitioned such that integrity of an entire row is preserved, and not split between partitions. The previous discussion, however, is not intended to be limiting as to other ways the integrity of data objects within a data file may be preserved when performing partitioning according to the identified number of partitions. For example, other types of data files may include pre-determined ranges, data blocks, pages, or bytes that may be marked as the beginning and/or end of data objects which may then in turn be used to determine partitions boundaries so that the data object integrity is maintained. In another example, data file metadata may indicate the locations of data objects within a data file sufficient to avoid splitting or rending data objects within data files when determining partitions.

Turning back to FIG. 7, the data may be dynamically partitioned according to the determined partitions at the storage client, as indicated at 730. In at least some embodiments, data may be read from local client data storage into system memory, and partitioned in system memory for upload, without generating partitions of the data file in local persistent storage, saving system resources at the storage client. Thus, data partitions may be generated on-the-fly, and be sent from system memory (as discussed below with regard to element 740). In various embodiments, multiple threads, or processes, may be instantiated for generating each partition of the data.

Various other operations may be performed before, during, and/or after the data is partitioned. FIG. 8, for example, illustrates that after dynamically partitioning data according to the determined partition boundaries, as indicated at 830, in some embodiments, the data partitions may be compressed according to a compression scheme, as indicated at 840. B-zip, Lempel-Ziv, run-length encoding, dictionary-based encoding, and/or other compression techniques may be employed to generate compressed versions of the data partitions as part of the process to generate the data partitions. As many different compression techniques are well-known to those of ordinary skill in the art, the previous examples are not intended to be limiting. The compressed data partitions may then be sent to another network-based service that includes a staging area accessible to data warehouse cluster for multi-part upload to the data warehouse cluster, as indicated at 850 (similar to the discussion below regarding to element 740 in FIG. 7).

More generally, modifications or changes to data partitions may be performed. For example, in some embodiments, instead of (or in addition to) performing compression, data partitions may be encrypted using various different encryption techniques. For example, a key-based encryption technique may be implemented such that a storage client alone may be configured to perform decryption for data uploaded to a data warehouse cluster using dynamic, multi-part upload.

As indicated at 740, in various embodiments, the dynamically partitioned data may be sent in parallel to another network-based service different than the data warehouse service that is part of the network-based services platform so that the data is eventually maintained in an upload staging area accessible to the compute nodes of the data warehouse cluster. For example, in some embodiments, the dynamically partitioned data may be sent to a single network-based service that maintains an upload staging area accessible to the data warehouse cluster. If, for instance, the single network-based service is a storage service that provides data storage for the storage client, the dynamically partitioned data may be sent to the storage service to be stored. The upload staging area may, in some embodiments, be a location, file path, nodes, system, storage, device, or other form of storage (which may be block-based or persistent storage) from which data warehouse cluster may access or receive the dynamically partitioned data from.

Sending the partitioned data in parallel may, in some embodiments, include sending each individual partition in parallel with other partitions, further dividing or sending a partition in further parts as part of a multiple part upload to the upload staging area, or some combination of sending partitions and parts of partitions to a network-based service for eventual staging in the upload area. For example, 8 partitions may be determined for a data file that is to be uploaded. 4 of the 8 partitions may be sufficiently large that a multi-part upload may be performed to send them (each in multiple parts) to a network-based storage service that maintains the upload staging area, while also sending the remaining 4 partitions in singe rather than multiple parts in parallel to the network-based storage service. Various different execution threads, processes, or other means for performing parallel operations may be used to perform sending dynamically partitioned data to the other network-based service, and as such, the previous example is not intended to be limiting.

In at least some embodiments, the dynamically partitioned data may be sent to one network-based storage service, which may perform various processing or other operations on the data, and then send it on to one or more other network-based services until it reaches a network-based storage service, such as the storage service discussed above, that includes an upload staging area. For example, the dynamically partitioned data may be sent in parallel to different nodes of an analysis, indexing, simulation, or other data processing network-based service that may perform various different operations on the respective partitions. These partitions may then be sent on to the example storage service for storage in the upload staging area. In at least some embodiments, the data may be modified, or reorganized to be in different groupings, or new partitions or parts for multi-part upload from the upload staging area, different than the dynamic partitions created at the storage client. For instance, if the dynamic partitions created and sent to a network-based service number 8 partitions, the receiving network-based service may process the partitions and combine them into 4 partitions. In at least some embodiments, modifications, reorganizations, or new partitions may still be made in accordance with the data distribution scheme for the data warehouse cluster.

Data may be sent parallel to the other network-based storage service in various ways. For example, in some embodiments, multiple execution threads may be instantiated for each data partition of the data to be uploaded. After partitioning the data, the execution threads may send their respective data partitions to the other network-based service. The other network-based service, in various embodiments, may be configured to receive a multi-part and/or parallel upload from the storage client. The other network-based storage service may place data directly in the upload staging area, or may perform one or more different operations on received data, such as indexing, encoding, analyzing, scanning, etc. . . .

As indicated at 750, an upload request may be sent to the data warehouse cluster for a multi-part upload of the dynamically partitioned data from the upload staging area to respective compute nodes in the data warehouse cluster, according to various embodiments. For example, an upload request may include an identification of the network-based service that maintains the upload staging area, a file path or location to the specific data, name, size, type, encryption, compression and/or various other information so that the data warehouse cluster may correctly identify and upload the data in the staging area. In some embodiments, for instance, the request may specify a particular pattern, scheme, or organization of the partitions in the upload staging area for upload.

In some embodiments, the data warehouse cluster may initiate the multi-part upload of the data from the upload staging area. For example, in some embodiments, a leader node may receive the upload request, and generate an execution plan for each the different compute nodes, so that the respective portions to be maintained at each of the compute nodes according to the data distribution scheme may be obtained by one or more data transfer operations by the compute node to the upload staging area. In this way, upload of data to the compute nodes of the data warehouse cluster may be performed in parallel. In other embodiments, the network-based storage service maintaining the data in the upload staging area may initiate and/or request the upload of the data in the upload staging area to the data warehouse cluster compute nodes.

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may be configured to implement the functionality described herein (e.g., the functionality of various servers and other components that implement the database services/systems and/or storage services/systems described herein). The various methods as illustrated in the figures and described herein represent example embodiments of methods. The order of any method may be changed, and various elements may be added, reordered, combined, omitted, modified, etc.

Embodiments of implementing dynamic multi-part upload for a data warehouse as described herein may be executed on one or more computer systems, which may interact with various other devices. FIG. 9 is a block diagram illustrating an example computer system, according to various embodiments. For example, computer system 1000 may be configured to implement a data warehouse cluster, a storage system, and/or a storage client, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the data warehouse system described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory).

System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a dynamic, multi-part upload module, a storage client, data warehouse cluster leader or compute node, or various components or nodes of a storage system, in different embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement one or more storage system server nodes, database engine head nodes, and/or clients of the database systems described herein), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 9 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a data warehouse cluster within a database warehouse service may present data warehouse services and/or other types of data storage services that employ the distributed storage systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:
1. A system, comprising:
  a plurality of compute nodes implementing a network-based services platform;
  at least some compute nodes of the plurality of compute nodes configured to implement a data warehouse cluster as part of a data warehouse service provided by the network-based services platform, wherein the data warehouse cluster provides data storage among the at least some compute nodes according to a data distribution scheme;
  another one or more compute nodes of the plurality of compute nodes configured to implement an upload staging area for the data warehouse cluster, wherein the upload staging area is accessible to the data warehouse cluster as part of the network-based services platform;
  at least one other compute node of the plurality of compute nodes configured to provide a dynamic, multi-part upload module from the network-based services platform to a storage client of the data warehouse cluster;
  the dynamic, multi-part upload module, configured to:

determine, at the storage client, a plurality of partitions for data maintained at the storage client to be uploaded to the data warehouse cluster according to the data distribution scheme for the at least some compute nodes in the data warehouse cluster;

dynamically partition the data at the storage client according to the determined plurality of partitions;

send the dynamically partitioned data from the storage client to the upload staging area for the data warehouse cluster; and subsequent to said sending the partitioned data, send, from the storage client, an upload request to the data warehouse cluster in order to upload the plurality of partitions of the data from the upload staging area to respective ones of the at least some compute nodes in the data warehouse cluster;

at least some compute nodes of the plurality of compute nodes of the network-based services platform, in response to receipt of the upload request, upload respective partitions of the plurality of partitions of the data in parallel from the upload staging area to respective ones of the at least some compute nodes in the data warehouse cluster.

2. The system of claim 1, wherein to determine the plurality of partitions for the data maintained at the storage client to be uploaded to the data warehouse cluster according to the data distribution scheme for the at least some compute nodes in the data warehouse cluster, the dynamic, multi-part upload module is configured to:

based, at least in part, on the data distribution scheme, identify a number of partitions for the data; and evaluate the data in order to determine partition boundaries corresponding to the number of partitions such that data objects maintained in each of the plurality of partitions remain intact.

3. The system of claim 1, wherein said dynamically partitioning the data at the storage client according to the determined plurality of partitions is performed in system memory of the storage client.

4. The system of claim 1, wherein the at least one other compute node is further configured to:

receive a multi-part upload request for the data from the storage client;

wherein said providing the dynamic, multi-part upload module to the storage client of the data warehouse cluster is performed in response to receiving the multi-part upload request.

5. The system of claim 1, wherein the dynamic, multi-part upload module is provided to the storage client asynchronously.

6. A method, comprising:

performing, by one or more computing devices implementing a storage client:

identifying, at the storage client, data to be uploaded to a data warehouse cluster from the storage client, wherein the data warehouse cluster provides data storage among a plurality of compute nodes according to a data distribution scheme;

determining, at the storage client, a plurality of partitions for the data according to the data distribution scheme for the plurality of compute nodes in the data warehouse cluster;

partitioning, at the storage client, the data according to the determined plurality of partitions;

sending, from the storage client, the partitioned data in parallel to an upload staging area that is accessible to the plurality of compute nodes of the data warehouse cluster; and subsequent to said sending the partitioned data, sending, from the storage client, an upload request to the data warehouse cluster for a multi-part upload of the partitioned data from the upload staging area to respective ones of the plurality of compute nodes in the data warehouse cluster.

7. The method of claim 6, wherein said determining the plurality of partitions for the data according to the data distribution scheme for the plurality of compute nodes in the data warehouse cluster comprises evaluating the data to be uploaded in order to determine partition boundaries for the plurality of partitions such that data objects maintained in each of the plurality of partitions remain intact.

8. The method of claim 6, wherein said partitioning the data according to the determined plurality of partitions comprises generating a compressed version of each of the plurality of partitions.

9. The method of claim 6, wherein said partitioning the data according to the determined plurality of partitions comprises generating an encrypted version of each of the plurality of partitions.

10. The method of claim 6, wherein said partitioning the data according to the determined plurality of partitions is performed in system memory at the storage client such that the plurality of partitions of the data are generated without creating local copies of the plurality of partitions in persistent storage at the storage client.

11. The method of claim 6, wherein the data warehouse cluster is one of a plurality of data warehouse clusters that together implement a data warehouse service;

wherein the method further comprises:

performing, by another one or more computing devices implementing a control interface for the data warehouse service:

receiving a multi-part upload request for the data from the storage client, wherein the multi-part upload request specifies the data warehouse cluster out of the plurality of data warehouse clusters; and in response to receiving the multi-part upload request, sending a dynamic, multi-part upload module to the storage client that is configured to perform said identifying the data to be uploaded, said determining the plurality of partitions for the data, said partitioning the data, said sending the partitioned data, and said sending the upload request.

12. The method of claim 6, wherein said sending the partitioned data in parallel to the upload staging area comprises:

sending the partitioned data to one or more additional network-based services that do not implement the upload staging area for further processing of the partitioned data, and wherein the partitioned data is further sent from the one or more additional network-based services to the upload staging area accessible to the plurality of compute nodes of the data warehouse cluster.

13. The method of claim 6, wherein one of the plurality of compute nodes is a leader node configured to store data received at the leader node among the plurality of compute nodes in the data warehouse cluster according to the data distribution scheme, and wherein the method further comprises:

identifying other data to be uploaded to the data warehouse cluster; and sending the other data to the leader node of the data warehouse cluster for storage among the plurality of compute nodes.

14. A non-transitory, computer-readable storage medium, comprising program instructions that implement a client-side, dynamic, multi-part upload module and that when executed by one or more computing devices cause the one or more computing devices to implement:

identifying, at a storage client, data to be uploaded to a data warehouse cluster from the storage client, wherein the data warehouse cluster provides data storage among a plurality of compute nodes according to a data distribution scheme;

determining, at the storage client, a plurality of partitions for the data according to the data distribution scheme for the plurality of compute nodes in the data warehouse cluster;

partitioning, at the storage client, the data according to the determined plurality of partitions;

sending, from the storage client, the partitioned data in parallel to an upload staging area that is accessible to the plurality of compute nodes of the data warehouse cluster; and subsequent to said sending the partitioned data, sending, from the storage client, an upload request to the data warehouse cluster for a multi-part upload of the partitioned data from the upload staging area to respective ones of the plurality of compute nodes in the data warehouse cluster.

15. The non-transitory, computer-readable storage medium of claim 14, wherein, in said determining the plurality of partitions for the data according to the data distribution scheme for the plurality of compute nodes in the data warehouse cluster, the program instructions cause the one or more computing devices to implement:

based, at least in part, on the data distribution scheme, identifying a number of partitions for the data; and evaluating the data in order to determine partition boundaries corresponding to the number of partitions such that data objects maintained in each of the plurality of partitions remain intact.

16. The non-transitory, computer-readable storage medium of claim 14, wherein said partitioning the data according to the determined plurality of partitions is performed in system memory at the storage client such that the plurality of partitions of the data are generated without creating local copies of the plurality of partitions in persistent storage at the storage client.

17. The non-transitory, computer-readable storage medium of claim 14, wherein, in said partitioning the data according to the determined plurality of partitions, the program instructions cause the one or more computing devices to implement generating a compressed version of each of the plurality of partitions.

18. The non-transitory, computer-readable storage medium of claim 14, wherein the partitioned data is modified at a network-based service into one or more different partitions prior to upload into the respective compute nodes of the data warehouse cluster.

19. The non-transitory, computer-readable storage medium of claim 14, wherein the client-side, dynamic, multi-part control module is sent to the storage client from a data warehouse control interface in response to a multi-part upload request received at the data warehouse control interface from the storage client.

20. The non-transitory, computer-readable storage medium of claim 19, wherein, in said determining the plurality of partitions for the data according to the data distribution scheme for the plurality of compute nodes in the data warehouse cluster, the program instructions cause the one or more computing devices to implement requesting from the data warehouse control interface a number of partitions for the data according to the data distribution scheme of the data warehouse cluster.

\* \* \* \* \*